US010121192B2

(12) United States Patent
Fontenot

(10) Patent No.: US 10,121,192 B2
(45) Date of Patent: Nov. 6, 2018

(54) ELECTRONIC SYSTEM FOR HEALTHCARE INSURANCE ACCOUNTS RECEIVABLE AND PATIENT FINANCING

(76) Inventor: Mark G. Fontenot, Lafayette, LA (US)

( * ) Notice: Subject to any disclaimer, the term of this patent is extended or adjusted under 35 U.S.C. 154(b) by 791 days.

(21) Appl. No.: 12/830,124

(22) Filed: Jul. 2, 2010

(65) Prior Publication Data
US 2011/0071860 A1 Mar. 24, 2011

Related U.S. Application Data

(60) Provisional application No. 61/222,893, filed on Jul. 2, 2010.

(51) Int. Cl.
*G06Q 40/00* (2012.01)
*G06Q 10/10* (2012.01)
*G06Q 40/08* (2012.01)

(52) U.S. Cl.
CPC .............. *G06Q 40/00* (2013.01); *G06Q 10/10* (2013.01); *G06Q 40/08* (2013.01)

(58) Field of Classification Search
CPC ........ G06Q 30/00; G06Q 40/00; G06Q 10/00; G06Q 20/00
USPC ...................................... 705/3–44
See application file for complete search history.

(56) References Cited

U.S. PATENT DOCUMENTS

| | | | | |
|---|---|---|---|---|
| 5,235,507 A | * | 8/1993 | Sackler | G06Q 20/102 705/2 |
| 6,208,973 B1 | * | 3/2001 | Boyer et al. | 705/2 |
| 6,879,959 B1 | * | 4/2005 | Chapman et al. | 705/2 |
| 7,398,218 B1 | * | 7/2008 | Bernaski | G06Q 50/24 705/3 |
| 7,617,114 B1 | * | 11/2009 | Tooke, III | G06F 19/328 705/2 |
| 7,765,132 B2 | * | 7/2010 | Wilson | G06Q 20/10 235/380 |
| 7,877,279 B1 | * | 1/2011 | Sturgis | G06Q 30/0203 434/322 |
| 7,945,497 B2 | * | 5/2011 | Kenefick | G06Q 40/00 705/35 |
| 8,676,609 B2 | * | 3/2014 | DiRienzo | G06F 3/0481 705/4 |
| 2004/0064386 A1 | * | 4/2004 | Goguen et al. | 705/34 |
| 2006/0218017 A1 | * | 9/2006 | Ren et al. | 705/4 |
| 2007/0226005 A1 | * | 9/2007 | Smith et al. | 705/2 |
| 2010/0145734 A1 | * | 6/2010 | Becerra | G06Q 40/08 705/4 |
| 2011/0066447 A1 | * | 3/2011 | Beery | G06F 19/328 705/2 |

(Continued)

OTHER PUBLICATIONS

How medicare claims are processed; CHA.*

*Primary Examiner* — Frantzy Poinvil

(57) ABSTRACT

Systems and methods for managing healthcare service provider accounts receivable relative to insurance revenue cycles and/or consumer debt revenue cycles are described. The systems and methods include a web-based electronic infrastructure for a service provider (e.g., medical, dental, etc.) revenue cycle. The dental revenue cycle of an embodiment comprises a direct insurance revenue cycle (DIRC), a dental consumer debt revenue cycle (DCDRC or Patient Financing System (PFS)), and a combined dental insurance and consumer debt revenue cycle running under and/or in association with a processing system embodied in an electronic dental finance platform (eDentaFi) platform.

59 Claims, 19 Drawing Sheets

(56) References Cited

U.S. PATENT DOCUMENTS

2013/0096952 A1\* 4/2013 Beery ................... G06F 19/328
  705/3

\* cited by examiner

| Provider of Consumer Debt Company | Acceptable FICO Scores |
|---|---|
| Company 1 | 650 |
| Company 2 | 750 |
| Company 3 | 700 |
| Company 4 | 725 |
| Company 5 | 650 |
| Company 6 | 700 |
| Company 7 | 700 |
| Company 8 | 660 |
| Company 9 | 725 |
| Company 10 | 680 |

FIGURE 4

(Prior Art)

| Cash Outflow to Dentist | | | | | | | | | | |
|---|---|---|---|---|---|---|---|---|---|---|
| Claim Number | | 1 | 2 | 3 | 4 | 5 | 6 | 7 | 8 | 9 |
| Claim filing date | | 2-Jan-09 | 9-Jan-09 | 16-Jan-09 | 23-Jan-09 | 30-Jan-09 | 6-Feb-09 | 13-Feb-09 | 20-Feb-09 | 27-Feb-09 |
| Claim Value | | $250.00 | $500.00 | $400.00 | $200.00 | $350.00 | $400.00 | $250.00 | $200.00 | $500.00 |
| Discount of Claim Value | 10% | (25.00) | (50.00) | (40.00) | (20.00) | (35.00) | (40.00) | (25.00) | (20.00) | (50.00) |
| Less processing fee | $5.00 | (5.00) | (5.00) | (5.00) | (5.00) | (5.00) | (5.00) | (5.00) | (5.00) | (5.00) |
| Gross Discounted Claim | | $220.00 | $445.00 | $355.00 | $175.00 | $310.00 | $355.00 | $220.00 | $175.00 | $455.00 |
| Less reconciliation carryover | | $0.00 | $0.00 | $0.00 | (100.00) | $0.00 | (25.00) | $0.00 | (50.00) | $0.00 |
| Net payment to dentist via wire transfer | | $220.00 | $445.00 | $355.00 | $75.00 | $310.00 | $330.00 | $220.00 | $125.00 | $445.00 |
| | | | | | | | | | | |
| Cash Flow to eDentaFi | | | | | | | | | | |
| Claim number | | | | 1 | 2 | 3 | 4 | 5 | 6 | 7 |
| Date of receipt of insurance payment | | | | 15-Jan-09 | 22-Jan-09 | 29-Jan-09 | 5-Feb-09 | 12-Feb-09 | 19-Feb-09 | 26-Feb-09 |
| Claim value | | | | $250.00 | $500.00 | $400.00 | $200.00 | $350.00 | $400.00 | $250.00 |
| Claim payment from Insurance company | | | | (250.00) | (400.00) | (400.00) | (175.00) | (350.00) | (350.00) | (250.00) |
| Reconciliation carryover | | | | $ - | $100.00 | $ - | $25.00 | $ - | $50.00 | $ - |

Figure 6

Dr. Jane Jones General Ledger for Patient John Smith

| | Transaction | | Dental Service Revenue | | Account Receivable | | Cash | | DIRC Processing Fee | |
|---|---|---|---|---|---|---|---|---|---|---|
| Date | Number | Debit | Credit | Debit | Credit | Debit | Credit | Debit | Credit |
| Delivery of Dental Services | 5-May-10 | 1 | | $250.00 | $250.00 | | | | | |
| Receipt of cash factored from dental claim | 6-May-10 | 2 | | | | $200.00 | $195.00 | | $5.00 | |
| Receipt of net cash from John Smith factored claim | 16-Jun-10 | 3 | | | | $50.00 | $40.00 | | $10.00 | |
| Totals | | | | $250.00 | $250.00 | $250.00 | $235.00 | | $15.00 | |
| Account Balances | | | | | $250.00 | $235.00 | | | $15.00 | | eDentafi General Ledger for Dr. Jane Jones

| | | Transaction | | Factor claims account payable | | Account receivable | | Cash | | DIRC Fee Processing Revenue | | Days Outstanding | Daily interest | Factoring Interest Revenue | |
|---|---|---|---|---|---|---|---|---|---|---|---|---|---|---|---|
| | Number | Debit | Credit | Debit | Credit | Debit | Credit | Debit | Credit | | | Debit | Credit |
| Assignment of John Smith dental insurance claim | 6-May-10 | 1 | | $250.00 | $250.00 | | | | | | | | |
| Cash disbursement for John Smith claim | 6-May-10 | 2 | $200.00 | | | | | | | $195.00 | $5.00 | | | |
| Cash from payer for John Smith dental claim | 15-Jun-10 | 3 | | | $250.00 | $250.00 | $250.00 | | | | | | |
| Disbursement of net cash for John Smith Claim | 15-Jun-10 | 4 | $50.00 | | | | | | $40.00 | | | 40 | 0.1000% | | $10 |
| Totals | | | $250.00 | $250.00 | $250.00 | $250.00 | $250.00 | $235.00 | | $5.00 | | | | $10 |
| Account Balances | | | | | | | | $15.00 | | $5.00 | | | | $10 |

FIGURE 7/1

| Dr. Jane Jones Entries | Date | Debit | Credit |
|---|---|---|---|
| Transaction 1 | 5-May-10 | | |
| Account Receivable, (patient John Smith) | | $250.00 | |
| Revenue, Dental Services | | | $250.00 |
| Deliver of dental services to John Smith | | | |
| | | | |
| Transaction 2 | 6-May-10 | | |
| Cash | | $195.00 | |
| Revenue cycle processing fee expense | | $5.00 | |
| Accounts receivable, (patient John Smith) | | | $200.00 |
| Assignment of insurance claim to eDentafi and receipt of discounted claim payment | | | |
| | | | |
| Transaction 3 | 16-Jun-10 | | |
| Cash | | $32.00 | |
| Revenue cycle processing fee expense | | $18.00 | |
| Accounts receivable, (patient John Smith) | | | $50.00 |
| | | | |
| | | | |
| eDentafi General Ledger Entries | Date | Debit | Credit |
| Transaction 1 | | | |
| Accounts receivable John Smith's Insurance claim | | $250.00 | |
| Accounts payable, Dr. Jane Jones for John Smith claim | | | $250.00 |
| Assignment of John Smith insurance claim by Dr. Jane Jones | | | |
| | | | |
| Transaction 2 | 6-May-10 | | |
| Accounts payable, Dr. Jane Jones for John Smith's claim | | $200.00 | |
| DIRC processing fee revenue | | | $5.00 |
| Cash | | | $195.00 |
| Payment of John Smith's discounted claim to Dr. Jane Jones | | | |
| | | | |
| Transaction 3 | 15-Jun-10 | | |
| Cash | | $250.00 | |
| Accounts receivable, John Smith's insurance company | | | $250.00 |
| Receipt of full payment of John Smith's Claim | | | |
| | | | |
| Transaction 4 | 15-Jun-10 | | |
| Accounts payable, Dr. Jane Jones for John Smith's claim | | $50.00 | |
| Factoring interest revenue | | | $10.00 |
| Cash | | | $40.00 |
| Cash disbursement of John Smith's reconciled claim | | | |

PFS Credit Application Form

PFS Doctor Identification Number:_____

FICO Scores: EquiFax _____    Experian _____    TransUnion _____

FICO Score Average:_____    FICO Score Range: Low _____ High _____

Estimated Fee to be Financed: $_____

Applicant Information

Name:_____

Address_____

City:_____ State:_____ Zip:_____

Date of Birth:_____    Social Security No.:_____

Home Phone:_____    Cell Phone:_____

Housing Information: Own    Rent    Other

Monthly Net Income:_____

Employer (Name, Address, Telephone):_____

Co-Application Information

Name:_____

Address_____

City:_____ State:_____ Zip:_____

Date of Birth:_____    Social Security No.:_____

Home Phone:_____    Cell Phone:_____

Housing Information: Own    Rent    Other

Monthly Net Income:_____

Employer (Name, Address, Telephone):_____

Applicant Signature:_____    Co-Applicant Signature:_____

| patients name | Jane Smith | | | | | |
|---|---|---|---|---|---|---|
| Amount Financed | $4,000 | | | | | |
| FICO Scores | | | | | | |
| Equifax | 678 | | | | | |
| Experian | 722 | | | | | |
| TranUnion | 688 | | | | | |
| Ave FICO Score | 696 | | | | | |
| | Average | | | | | |
| Credit Card Company | FICO Threshold | Decision | Dentist Payment | Jane Smith's Credit Terms | Credit Limit | Select plan or Finance Product |
| Company 1 | 650 | Accepted | $3,680.00 | | $4,000.00 | |
| Company 2 | 750 | Denied | | | | |
| Company 3 | 700 | Denied | | | | |
| Company 4 | 725 | Denied | | | | |
| Company 5 | 650 | Accepted | $3,800.00 | 6% for the first year, 15% after the first year | $7,500.00 | |
| Company 6 | 700 | Denied | | | | |
| Company 7 | 700 | Denied | | | | |
| Company 8 | 660 | Accepted | $3,400.00 | Interest Free for 24 months, 24% annually 24 months | $5,000.00 | |
| Company 9 | 725 | Denied | | | | |
| Company 10 | 680 | Accepted | $3,520.00 | Interest Free for 12 months, 18% annually after 12 months | $5,000.00 | |

Figure 11

| Example Treatment Plan using eDentafi Platforms | | |
|---|---|---|
| Dental services provided | $5,000 | |
| Covered by dental insurance | $1,000 | |
| Patient out-of-pocket cost | $4,000 | |
| | | |
| eDentafi Financing Platforms | | |
| Dental Insurance Revenue Cycle | | |
| Insurance claim amount | | $1,000 |
| eDentafi processing fee | $5.00 | (5.00) |
| Claim discount | 20% | (200.00) |
| Payment to dentist in 24 hours | | $795.00 |
| | | |
| Number of days to collect insurance payment | 20 | |
| Annual factoring rate | 36% | |
| Factoring fee | | (19.73) |
| Payment to dentist after insurance collection | | $180.27 |
| Total insurance paid to dentist | | $975.27 |
| | | |
| Patient Financing System | | |
| Amount to be financed by PCD | | $4000 |
| Discount by PCD | 10% | (400.00) |
| eDentafi transaction fee | $5.00 | (5.00) |
| Net payment to dentist using PFS | | $3,595.00 |
| | | |
| Cash Flow to Dentist | | |
| Cash payments to dentists within two business days | | |
| Cash from factoring | | $795.00 |
| Cash from PCD financing | | $3595.00 |
| Total cash payments to dentist within two business days | | $4390.00 |
| Cash payment from remaining factored insurance | | $180.27 |
| Total cash payments to dentist | | $4570.27 |

Figure 16

ELECTRONIC SYSTEM FOR HEALTHCARE INSURANCE ACCOUNTS RECEIVABLE AND PATIENT FINANCING

RELATED APPLICATION

This application claims the benefit of U.S. Patent Application No. 61/222,893, filed Jul. 2, 2010.

TECHNICAL FIELD

Embodiments are described relating to systems and methods for service provider dental and medical accounts receivable relative to insurance revenue cycles and/or consumer debt revenue cycles.

BACKGROUND

In the US, there are approximately 150,000 dentists practicing in 120,000 dental offices scheduling over 550 million patient visits and performing over 1 billion dental procedures, resulting in $102 billion in dental services. Gross billings for general dental practitioners (GP) and specialists average on the order of $650,000 and $800,000, respectively. The GP with one hygienist schedules an estimated 4,000 patients visits per year and the specialist with a hygienist sees 5,250 patients annually.

Research reports show that billing for dental services increased from approximately $90.5 billion in 2006 to approximately $102 billion in 2009. Of the $102 billion, approximately $95.4 billion was provided from private sources and the remaining approximately $6.5 billion paid for by public funding. Private sources for financing dental expenditures are derived from patient out-of-pocket payments (approximately $45 billion) and private health insurance (approximately $50 billion). The average dental insurance claim to a private insurer is estimate to be $160.

The largest provider of dental insurance is Delta Dental. In 2007, Delta Dental served over 25% of the estimated 173 million Americans with dental insurance, providing national dental coverage to over 51 million. Delta Dental member companies processed over 76 million dental claims in 2007. In the US, it is estimated that over 300 million dental insurance claims are submitted annually for $57 billion of reimbursement via private insurance and public funding for dental services (approximate average of $160 per dental claim). There are hundreds of large and small companies providing dental insurance coverage.

Dental and medical offices are surprisingly diversified and multi-functional from the perspective of administrative and business processes in the delivery of dental and medical services. However, dental offices, for example, have under-invested in technology and human resources to streamline financial and accounting transactions relating to billing and collecting for dental services as well as offering patients opportunities to finance dental procedures, and thus increase dental revenues for the dentist. Dental offices must integrate a number of business processes to maintain or build a dental practice ranging from marketing the dental practice, to interfacing with dental laboratories for prosthetics, to billing and collecting for dental services. In the latter and as mentioned above, dental offices are confronted with the complexities of collecting payments from patients for the delivery of dental services. Frequently, dentists and their offices lack the infrastructure and/or know-how to (1) price and collect payments for dental services, (2) offer and administer financing options for patients, and (3) invoke working capital and cash management strategies to maximize practice cash flows. With the continuous evolution of new dental technologies facilitating more advance dental procedures with positive clinical outcomes, creates additional challenges from the perspective of patient financial acceptance of these typically costly dental procedures. It is believed that 75% of patients find it difficult to write a check for $500 at a dental appointment. A number of providers of consumer debt offer financing products to patients through dental practices, however, dental offices often find these products difficult to integrate into the practice flow, i.e., paper intensive and difficult to administer. It is interesting to note that patients with dental insurance are far more likely to accept more advance and costly dental procedures.

Dental insurance is a complicated task for dental offices, many of which are not equipped and/or have the human resource capacity to efficiently process dental claims for the patient and, at times, take this form of payment as full or partial payment for dental services provided. FIGS. 1A and 1B described below (referred to collectively as FIG. 1) characterize the dental insurance revenue cycle. The patient is scheduled for an appointment, examined by the dentist, presented with a treatment plan, and/or treatment or services are delivered by the dentist. If the patient has insurance, either (1) the dental office can process the claim as full or partial payment when dental services rendered or (2) direct the patient to pay for the dental services delivered and instruct the patient file to file his/her claim with the dental insurance company.

Processing a patient's dental insurance is a complex process that requires knowledge and a skill set of dental insurance claim process and the supporting technology to file and reconcile the claim back to the patient's account within the dentist's practice management system in general and, in particular, the business rules of specific dental insurance policies. The dental insurance reimbursement process adopted by many dental offices uses paper as the submission medium, which is slow and labor intensive, often resulting in incorrect submissions and/or long reimbursement cycles. Dental insurance claim processing by dental offices is inefficient and paper intensive, using paper submissions to payers via US mail with reimbursement by check sent to the provider by US mail. Today, there are a number of companies offering electronic services for the dentist to electronically submit dental insurance claims to the dental insurance plans (payer), however, payments and supporting documentation detailing the services reimbursed by the dental insurance plan are paper and mailed to the dentist. The cost to process claims using paper is an expensive process that takes time and is often inaccurate secondary to human error. It is known that many dental offices generally lack a complete knowledge of the many business rules underlying insurance reimbursement of dental procedures as well as the infrastructure and processes to accurately file a dental insurance claim with the patient's dental insurance plan and receive and post payment from the dental insurance plan to the patient's account balance within the dentist's practice management system.

FIG. 1A is a block diagram of the conventional dental insurance revenue cycle under the prior art. FIG. 1B is a flow diagram of a dental insurance reimbursement cycle under the prior art. After delivery of dental services, the dental insurance revenue cycle is initiated with the dental office completing a dental claim form having the patient's name, address, insurance carrier, name of the provider, and dental procedures performed. The claim is submitted to the payer, or an intermediary such as a dental clearinghouse which then submits the claim to the payer. The payer reviews the claim and determines to adjudicate the claim by paying it in full with supporting documentation, partial pays the claims and sends supporting documentation explaining partial payment, or rejects the claim with supporting documentation for denial or no payment. Payment in the form of a check is typically sent to the provider via US mail along with the supporting documentation detailing the services that were reimbursed by the dental insurance plan. The temporal range of the dental insurance revenue cycle ranges from approximately 20 days for simple claims to more than 90 days or more for complex, delayed, or incorrectly filed claims. Many dental offices have aged dental insurance receivables greater than 60 days due to a number of factors including but not limited to complex and complicated business rules for insurance reimbursement, clerical errors, delays due office understaffing, and inefficient claim processing and posting (paper submissions).

Many times patients want to accept dental treatment plans proposed by dentists, but find it difficult to pay for these services. On the other hand, dentist would like patients to accept and pay for dental treatment plans, but are unable to extend financing. There are many providers of consumer debt that offer financial products to patients through dental offices. For example, CareCredit markets financing options for patients through providers such as no interest, low monthly payment options, no up-front costs, no prepayment penalties, and no annual fees to the patient. These providers of consumer debt finance dental procedures based on the patient's credit worthiness. Typically, the provider of debt such as CareCredit pays the dentist on the order of 90% of the financed dental procedure and sends the patient a credit card and credit card statement reflecting the type of credit product extended. When compared to dental insurance revenue cycles for dental offices, consumer debt financing products are slightly less cumbersome to manage, however, dental offices usually only offer finance products from one or two providers of consumer debt.

It is common for patients to seek creative financing to pay for their elective or necessary healthcare procedures. In the US, for example, approximately 150,000 dentists deliver $102 billion in dental services to patients, of which approximately 50% is covered by public or private dental insurance and the remaining 50% from patient out-of-pocket costs. Many times, patients are presented with dental treatment plans that may exceed their immediate cash capacity, however, these patients are credit worthy to receive debt financing of out-of-pockets costs for their dental treatment. A patient may require, for example, dental treatment totaling $5,000 for dental services. In this example, the patient may have dental insurance that covers $1,000 of the proposed $5,000 dental treatment plan, leaving $4,000 of patient out-of-pocket costs. Many dental patients cannot immediately afford the $4,000 out-of-pocket cost for the dental treatment plan. Depending on the credit worthiness of the patient or the patient-dentist relationship, the patient may have credit extended in the form of consumer debt financing provided by a third party such as a bank or credit card company, or the dentist may elect to finance some or all of the proposed $4,000 in out-of-pocket costs for the dental treatment plan.

There are numerous credit card companies and providers of consumer debt (PCD) financing companies offering finance products to healthcare patients wanting or needing credit to pay for out-of-pocket costs for healthcare treatment. In the dental market segment, for example, there are many PCD financing companies such as CareCredit, Citi Health, Wells Fargo Financial, MedChoice, and Chase Health Advantage. FIGS. 2 and 3 are flow diagrams for conventional patient financing for healthcare procedures, as known in the art. Using the dental treatment example described above, and with reference to FIG. 3, the dental office (or dentist) can submit a credit application to CareCredit for the patient in the amount of $4,000. Credit applications used by PCD financing companies for healthcare treatment generally request the patient name, address, social security number, employment, information, and amount of the medical or dental procedure or treatment plan to be financed. The PCD financing companies provide their specific credit application form (CAF) for healthcare providers to use. In the case of CareCredit, for example, it provides a paper CareCredit CAF requesting the patient name, address, social security number, employment, and co-application information. The patient completes and signs the paper CareCredit CAF. The dental office (or healthcare provider) submits the CAF via facsimile or email (the paper CAF is converted to a PDF file that is attached to an email) to CareCredit.

Upon receipt of the CAF, CareCredit would use the patient's information provided on the CAF and request the patient's FICO score from credit bureaus such as Equifax, Experian, and/or TransUnion (a FICO score is a measure of credit risk). Using the FICO score and the amount to be financed, CareCredit would determine the credit worthiness of the patient in rendering a decision to extend credit. CareCredit then returns a decision via facsimile or return email of whether or not to extend credit to the patient. If credit is extended to the patient, the dental treatment plan is started, CareCredit sends payment to the dental office, and the patient would receive a CareCredit statement for payment.

A credit score in the United States is a number representing the creditworthiness of a person or the likelihood that person would pay his or her debts. The credit score has been demonstrated to be very predictive of risk and, therefore, has made credit more widely available to consumers and lowered the cost of providing credit. A credit score is primarily based on a statistical analysis of a person's credit report information, typically from the three major American credit bureaus, namely Equifax, Experian, and TransUnion. Lenders, such as banks and credit card companies, use credit scores to evaluate the potential risk posed by lending money to consumers and to mitigate losses due to bad debt. Using credit scores, lenders determine who qualifies for a loan, at what interest rate, and to what credit limits. Because a score does not consider race, sex or ethnicity, it is generally considered to be the most fair and objective underwriting tool available to lenders. The Federal Reserve Board did a study that noted scores have increased the availability of credit and reduced the cost of credit. Scores have also proven to be very predictive in assessing risk.

Credit scores are designed to measure the risk of default by taking into account various factors in a person's financial history. Although the exact formulas for calculating credit scores are closely-guarded secrets, FICO has disclosed the following components and the approximate weighted contribution of each:

1. Payment history (35% contribution to scoring) includes late payments on bills, such as a mortgage, credit card or automobile loan, can cause a consumer's FICO score to drop. Paying bills timely should improve a FICO score.

2. Credit utilization (30% contribution to scoring) is the ratio of current revolving debt (such as credit card balances) to the total available revolving credit (credit limits). Consumers can improve their FICO scores by paying off debt and lowering their utilization ratio. The closing of existing revolving accounts may adversely affect this ratio and therefore have a negative impact on their FICO score.

3. Length of credit history (15% contribution to scoring).

4. Types of credit used (10% contribution to scoring) such as installment, revolving, and consumer finance.

5. Recent search for credit and/or amount of credit obtained recently (10% contribution) includes multiple credit inquiries for a consumer seeking to open new credit, such as credit cards, retail store accounts, and personal loans, can hurt an individual's score. Applying for lots of new credit in a short period of time is also viewed as risky and can cause a drop in an individual's score. However, individuals shopping for a mortgage or auto loan over a short period would likely not experience a decrease in their scores as a result of these types of inquiries.

A FICO score ranges between 300 and 850, with 300 being a poor score and high credit risk whereas, and 850 being a good score and low credit risk. Generally, aggregate consumer FICO scores exhibit a left-skewed distribution with 60% of scores near the right between 650 and 799. According to FICO the median score is 723. The performance of the scores is monitored and the scores are periodically aligned across scorecards within each scoring model, as well as across the three credit bureaus, so that the score represents the same credit risk to lenders regardless of its source. Each individual actually has three credit scores for the FICO scoring model because the three national credit bureaus, Experian, Equifax and TransUnion, each have its own database. Consequently, data about an individual consumer can vary from bureau to bureau.

Returning to the $4,000 in out-of-pocket patient costs in the dental treatment plan example above, CareCredit would seek the patient's FICO score by submitting at least the patient's name, address, and social security number (garnered from the paper CAF) to the national credit bureau(s). If more than one FICO score is procured from more than one credit bureau, these FICO scores can be averaged or an acceptable range set by CareCredit. CareCredit, for example, may have a minimum acceptable FICO score threshold of 700 for financing of dental procedures under $10,000. FIG. 4 shows an example profile of the variation in acceptable credit scores among PCD financing companies, as know in the art. Generally, patients with lower FICO scores that are extended credit may have credit terms that reflect the risk (discount to dentist and/or high interest rate) corresponding to the amount of credit extended to them.

As such, if the patient's FICO score, for example, is 675, then the patient may not be approved for credit for some providers of consumer debt. If, on the other hand, the patient's score is 750, he/she may be approved for credit and have the $4,000 out-of-pocket cost of the dental procedure covered by CareCredit by extending credit to the patient. If approved, for example, CareCredit would forward $4,000 to the dentist less any fees such as transaction fees, prepaid interest, etc., thus netting the dentist for example $3,600. As such, $400 was held back by CareCredit for the cost such as processing and cost of financing. In turn, CareCredit may have a consumer finance product that extends the patient interest free financing for one year for example. Nonetheless, the patient secured financing for the $4,000 out-of-pocket costs for the dental procedure and the dentist delivers a dental service to the patient.

In the event the patient's FICO score (for example 675) is below the acceptable threshold level of CareCredit (assume CareCredit is Company 3 and the acceptable FICO score is 700 for the example above) and CareCredit rejects the patient's CareCredit credit application, then the dental office may restart the credit application process, pursue alternative financing, or not deliver dental treatment because of lack of financing (see FIG. 3). More specifically, if the patient elects to submit another application to a PCD financing company, the patient then completes a CAF for a second PCD financing company and the dental office submits the credit application to the second PCD financing company (FIG. 3). Since a portion of the FICO credit score has a component tied to the number of times the FICO score is search by PCD financing company, submitting additional credit applications and procuring the patient's credit score from a credit bureau (s) may have an adverse affect on the patient's FICO score. In addition, the dental office has to start the credit application process, which is time consuming.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 4 shows an example profile of the variation in acceptable credit scores among PCD financing companies, as know in the art.

FIG. 6 is an example schedule of DIRC account reconciliation for automated or selected factoring, under an embodiment.

FIG. 7 is an example schedule accounting transactions of DIRC account reconciliation for automated or selected factoring, under an embodiment

FIG. 10 is an example electronic CAF of the PFS, under an embodiment.

FIG. 11 is an example PFS presentation of the results of the PFS process, under an embodiment.

FIG. 16 shows an example of a patient seeking the services of a dentist that is recommending a $5,000 dental treatment plan, $1,000 of which is covered by the patient's dental insurance plan and the remaining $4,000 would be required to be covered by the patient as an out-of-pocket cost, under an embodiment.

DETAILED DESCRIPTION

Systems and methods for managing healthcare service provider accounts receivable relative to insurance revenue cycles and/or consumer debt revenue cycles are described below. The systems and methods include, in an embodiment, a web-based electronic infrastructure for a medical and/or dental revenue cycle. The dental revenue cycle of an embodiment comprises a direct insurance revenue cycle (DIRC), a dental consumer debt revenue cycle (DCDRC or Patient Financing System (PFS)), and a combined dental insurance and consumer debt revenue cycle, each of which is described below. The systems and methods described herein include and/or run under and/or in association with a processing system embodied in the electronic dental finance platform (eDentaFi) platform and the DIRC and DCDRC. The processing system includes any collection of processor-based devices or computing devices operating together, or components of processing systems or devices. The healthcare service provider, or service provider, described herein includes dentists and physicians, but is not so limited.

Figure 5A:
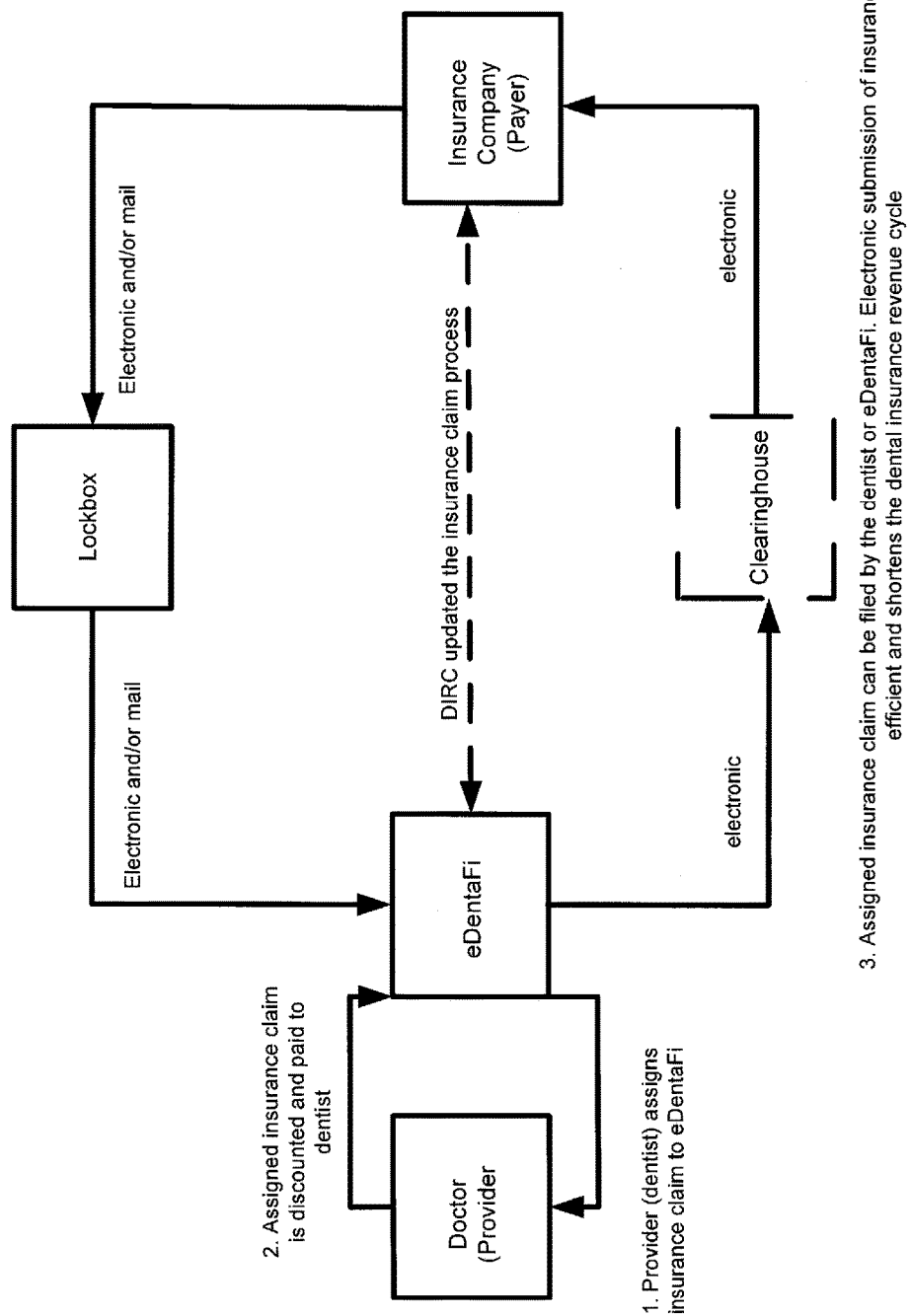
FIG. 5A is a flow diagram of the eDentaFi Direct Insurance Recovery Cycle (DIRC) enabled by the eDentaFi system or platform, under an embodiment.
Figure 5B:
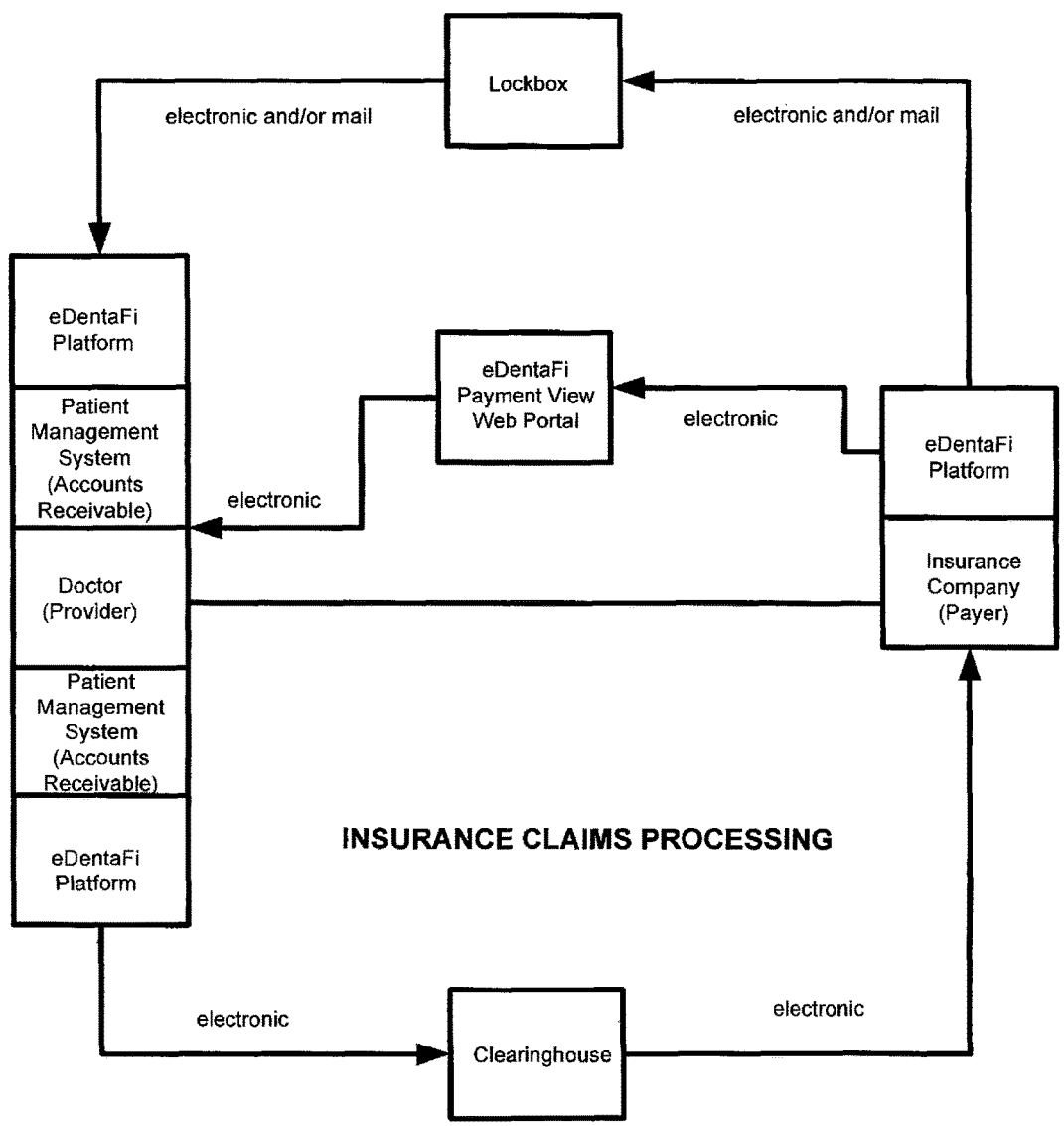
FIG. 5B is a block diagram of the eDentaFi system or platform for the eDentaFi DIRC, under an embodiment.

FIG. 5A is a flow diagram of the eDentaFi DIRC enabled by the eDentaFi system or platform, under an embodiment. FIG. 5B is a block diagram of the eDentaFi system or platform for the DIRC, under an embodiment. FIG. 6 is an example schedule of DIRC account reconciliation for automated or selected factoring, under an embodiment. The eDentaFi platform, including DIRC (with and without factoring), is electronically coupled to one or more computers or systems (e.g., patient management system) at a treatment facility (e.g., doctor's office, dentists office, etc.) and to insurance companies or payers. The coupling includes any type or combination of network technologies. With reference to FIGS. 5A and 5B the elements of the DIRC include, but are not limited to scoring, autoreconciliation, factoring, and insurance revenue recovery, each of which is described below.

The scoring of an embodiment is a measure of the dental insurance reimbursement process at the level of the dental practice which incorporates the following but not limited to: patient population and their insurance carrier (private versus public, mix); dental office processes used for dental insurance reimbursement (paper versus electronic); current and historical aged insurance receivable (which is a indirect measure of the insurance reimbursement process adopted by the dentist); type of dental practice, i.e., solo versus group, specialty, location (urban versus rural), etc.; and, number of dental claims submitted and insurance amounts reimbursed. The systems and methods herein are not limited to dental applications as they can be implemented with many types of service providers.

The factoring of an embodiment includes automated factoring and selective factoring. The insurance revenue recovery of an embodiment comprises automated insurance recovery and selective insurance recovery.

A host dental office integrates the DIRC platform into the dental practice using the eDentaFi platform. The integration is accomplished via a subscription agreement (monthly fee) and/or per-claim fee (per transaction basis), for example. The DIRC can run or be accessed in the background of dental practice management systems, via a web portal, and/or as a stand-alone offering.

A host dental office implementation of the DIRC begins with a patient completing patient information forms that collect the patient name and address as well as their dental insurance profile. The patient is examined by the dentist and a treatment plan is presented to the patient. For some payers, a pre-determination (or eligibility) of dental insurance benefits and the amounts paid can be procured before the delivery of dental treatment. Dental treatment is delivered and the dental claim can be submitted for adjudication and payment by the dental insurance company.

The dental insurance revenue cycle generally comprises one or more of the following:

1. The dentist and his/her office personnel assembling a bill or claim describing the services that the dentist provided to the patient.
2. The accounting for the dental services is entered into the dentist's practice management system.
3. The dentist submits the claim to the insurance company via an electronic submission, facsimile, or U.S. mail.
4. The insurance company receives and reviews the claim against a contract (insurance policy) to determine the amount, if any, to be paid by the insurance company for the claim (services provider by the dentist) to the patient.
5. The insurance company mails a check or sends a electronic funds transfer (EFT) to the dentist for the claim amount and send a detailed description of the services that were paid to the dentist (referred to as an Explanation of Payment or EOP and can be sent electronically in the form of an electronic remittance advice or ERA) and a similar description of services sent to the patient detailing payments to the dentists (referred to as an Explanation of Benefits or EOB).
6. In the accounting module of the practice management system, the dentist (dental office) manually matches the dental insurance payment with the dental, claim, and balances and reconciles the payment to update the patient's account.

Dental insurance payments and accompanying EOP can be sent directly to the dentist or the dentist's bank via a lockbox. The lockbox is a facility comprises a post office box which is monitored by the bank or lockbox facility. The lockbox mail generally comprises paper checks and remittance advices from dental insurance companies, which is opened by the lockbox facility. All insurance information is digitally scanned by the lockbox facility with the information forwarded to the dentist and checks deposited into the dentist's bank. The dental insurance company may send ERA directly to the dentist or to a clearinghouse for distribution to the dentist.

The dentist will manually post the insurance payment and payment information into their practice management system, and in particular, the patient's account receivable file. This is a labor intensive process that is susceptible to human error and theft. The payment information is posted and matched to the claim information. The patient's account is balanced and reconciled, and the patient is responsible for any outstanding unpaid balance.

A clearinghouse serves several purposes including but not limited to helping the dentist route dental claims to various dental insurance companies through on electronic connection for example. Clearinghouses may also assist dental insurance companies by consolidating claims from many different dentists. Clearinghouses may, at times, edit a dental claim to enable the dental insurance company to process the claim to their claim format.

The dental insurance revenue cycle is complex and fragmented. Dentists are disadvantaged and challenged to navigate the dental insurance claims process with the myriad of dental insurance plans and dental insurance companies, many times each with their own proprietary claim requirements, adjudication and reimbursement procedures. Dentist are compelled to comply with extensive federal and state laws and regulations such as the Health Insurance Portability and Accountability Act of 1996 (HIPAA) and federally mandated reimbursement procedures. At the time dental services are delivered and covered in some part by dental insurance, dentists may collect a portion of the amount due from the patient and/or defer collection from the patient after payment is received from the dental insurance company, at which time the patient's account receivable balance is reconciled.

With reference to FIGS. 5A and 5B, following is a description of integration of the DIRC into a dental practice and dental revenue cycle when factoring a claim. To factor a dental claim using the proposed invention, the eDentaFi platform intermediates the dental insurance revenue cycle and improves the dental insurance revenue cycle and significantly reduces the dentist's insurance accounts receivable balance. Since the eDentaFi platform streamlines and optimizes the dental insurance revenue cycle, the dentist is advantaged. In addition, when factoring dental insurance claims, the dentist significantly reduces their dental insurance accounts receivable. The dental claim is assigned to eDentaFi through the DIRC platform. Assignment of the claim can be automatic if the dentist has subscribed for automated DIRC or selective allowing the dentist to select certain patients or insurance policies to be processed using DIRC.

The assigned claim is discounted and paid. In particular, the dental insurance claim is assigned to eDentaFi and the eDentaFi platform discounts the claim value and pays the dentist a portion (discount) of the claim value (typically on the order of 75% to 80% of the claim value). The discount factor is predetermined and can be tied to the scoring of the dental office (e.g., patient population cross section of carriers, etc), type of insurance policy, procedure, and amount. The amount of the dental claim is discounted appropriately and the discounted amount is paid to the dentist within a pre-specified period of time (e.g., 24 hours). The claim assignment is automatic or selective. Automatic assignment is executed under an agreement to automatically assign dental insurance claims to the eDentaFi DIRC for factoring and processing. Selective assignment is non-automatic and the dental office can manually select, through the eDentaFi web portal, whether to assign and factor a particular claim.

In FIG. 5B, the dental insurance claim enters the insurance claim processing side of the electronic DIRC. The dental claim is generally submitted electronically via a dental clearinghouse (e.g., DentalXchange), but is not so limited. The dental claim is adjudicated and paid by the payer (dental insurance plan or dental insurance company). The amount of the claim paid by the payer or insurance company is collected by eDentaFi. The payment in the form of a check and supporting detailed information about the payment can be sent via U.S. mail to the eDentaFi lockbox. The lockbox facility opens the mail, digitally scans the insurance check and supporting payment information, and electronically sends the information to the eDentaFi platform. This information is electronically imported by the eDentaFi platform and posted to the payee's (assigned claim) account in the eDentaFi platform. Alternatively, the payment can be sent electronically and the payment electronically posted to the payee's accounts in the eDentaFi platform. After the insurance payment is matched against the assigned claim, it is reconciled and posted. Any unpaid is amount is taken against future discounted or factored dental insurance claims by the dentist or reconciled in a timely manner with the dentist (see FIG. 6). Alternatively, the claim can be re-submitted with or without additional information for review and possible payment by the payer.

In considering automatic and selective factoring and account reconciliation, in the patient dental billing cycle, if the patient has dental insurance the process of initiating a dental insurance claim with the intent to factor brings forward the DIRC platform to integrate the dental claim, payment of dental claim by payer, and factoring process. Once the dental claim is assigned to the eDentaFi platform, the eDentaFi platform will intermediate and link the dental insurance revenue cycle transacted through eDentaFi to the dentist's practice management system. The DIRC is optimized to file the claim electronically or can be integrated to allow the dentist's resident practice management system to process and file the assigned dental claim. The dental insurance claim form is populated with dental services delivered as well as the patient's name, address, dental insurance coverage, dentist delivery the dental services. If necessary, a radiograph (digital or film) or other supporting data is attached to the dental insurance claim or any other aspect of the claim necessary to show that treatment has been delivered. Once the claim has been assigned to eDentaFi and submitted to the payer (dental insurance company), the claim value is discounted and payment in the form of a wire transfer or paper check is sent to the dentist within a pre-specified period (e.g., 24 hours) less any other reconciled amount (see FIG. 6) such as a processing fee. Upon assignment of the dental claim to the eDentaFi platform and transfer of discounted cash proceeds for the discounted claim, the eDentaFi platform would send a file to auto post or manually post the transaction to the dentist's practice management system at the level of the patient account.

Figure 1A:
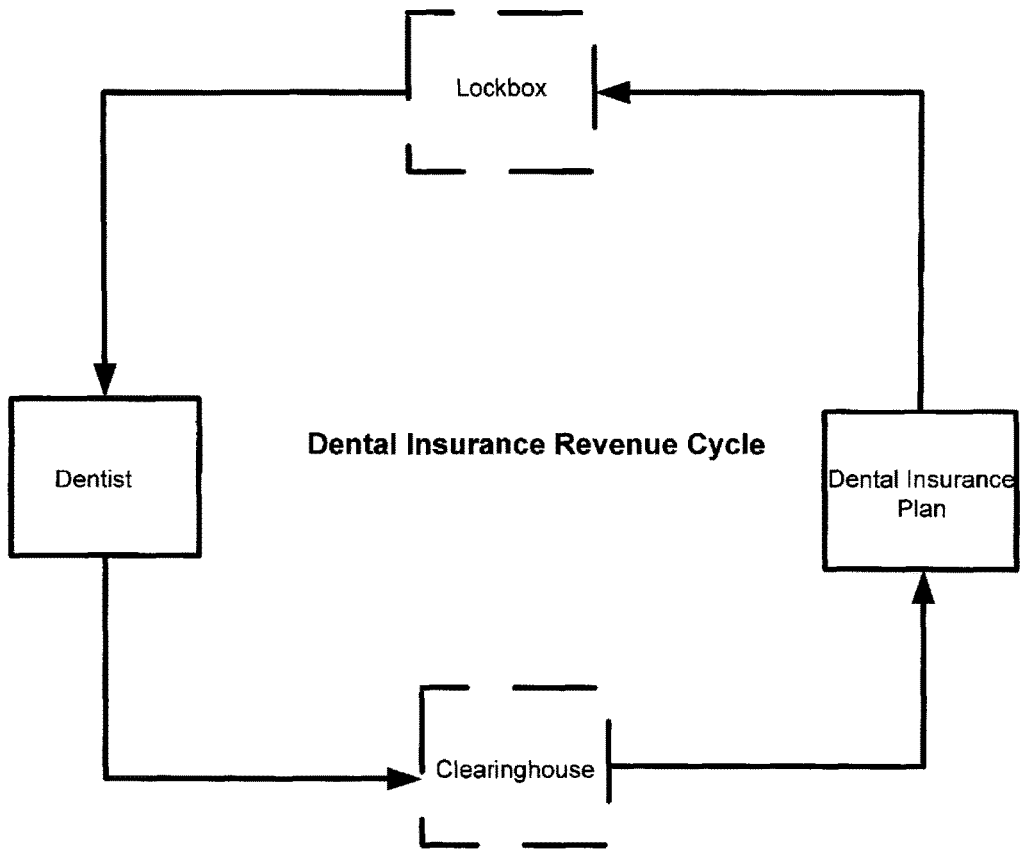
FIG. 1A is a block diagram of the conventional dental insurance revenue cycle under the prior art.
Figure 1B:
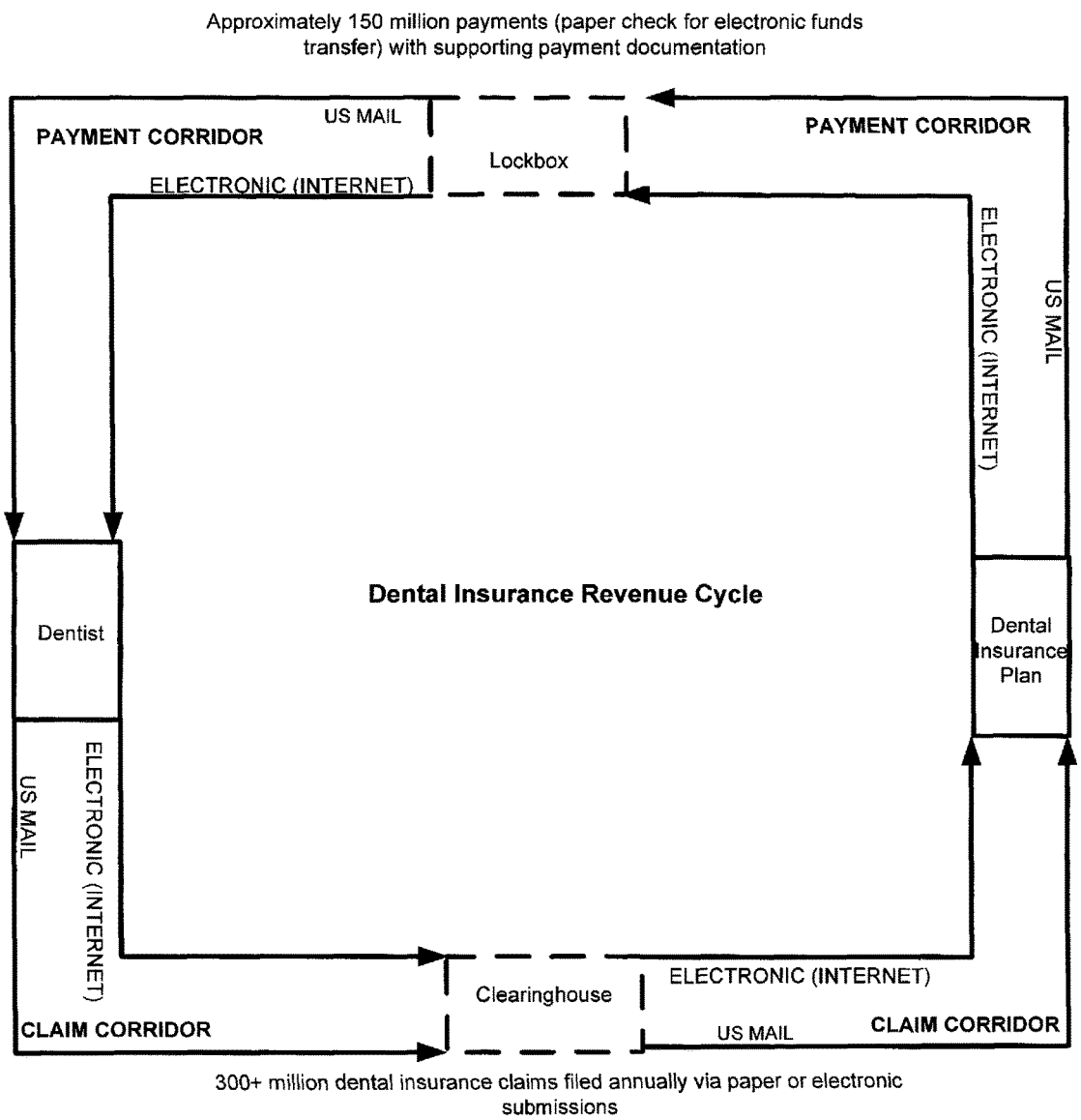
FIG. 1B is a flow diagram of a dental insurance reimbursement cycle under the prior art.
Figure 2:
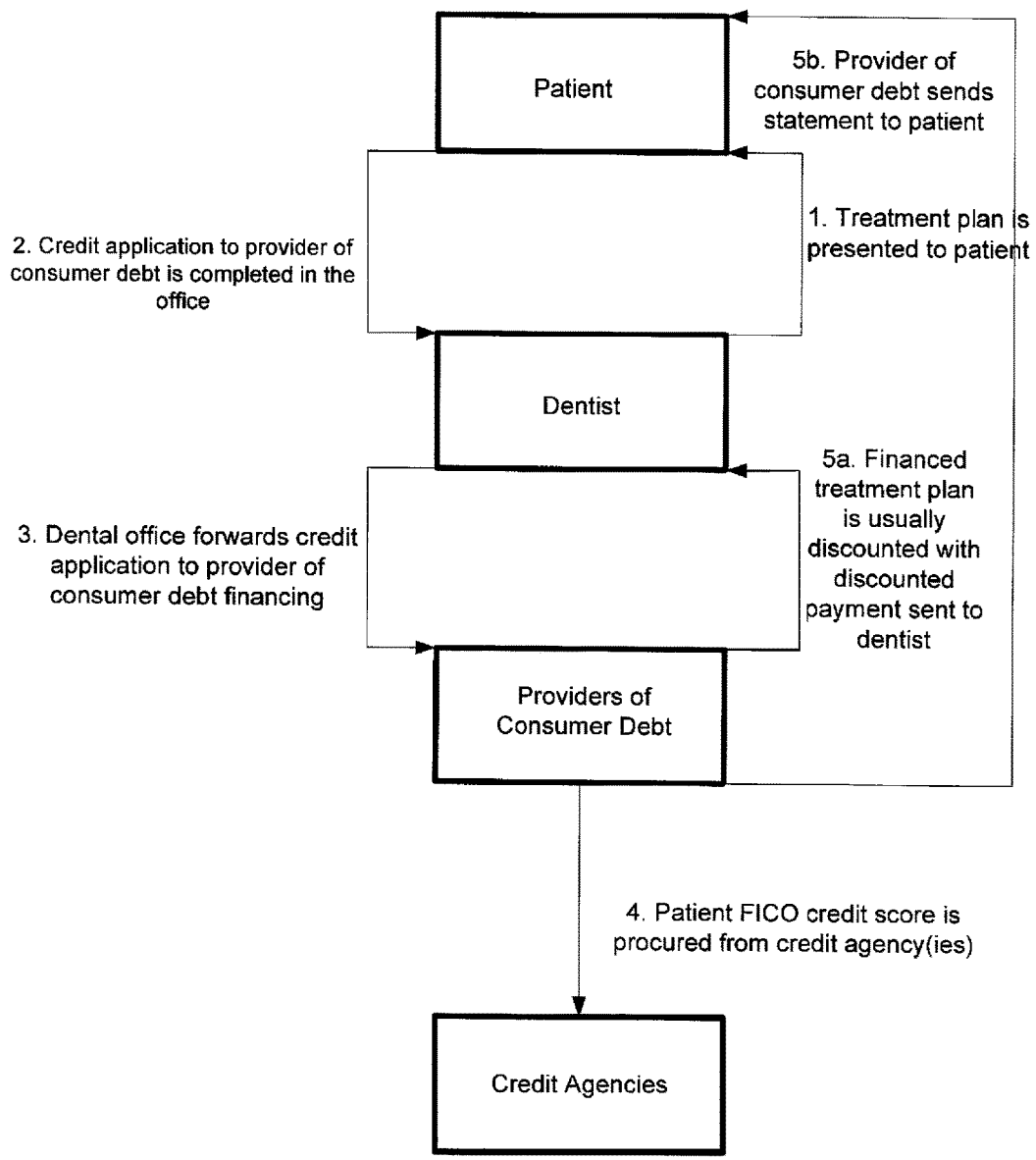
FIG. 2 is a block diagram of the conventional dental consumer debt revenue cycle under the prior art.
Figure 3:
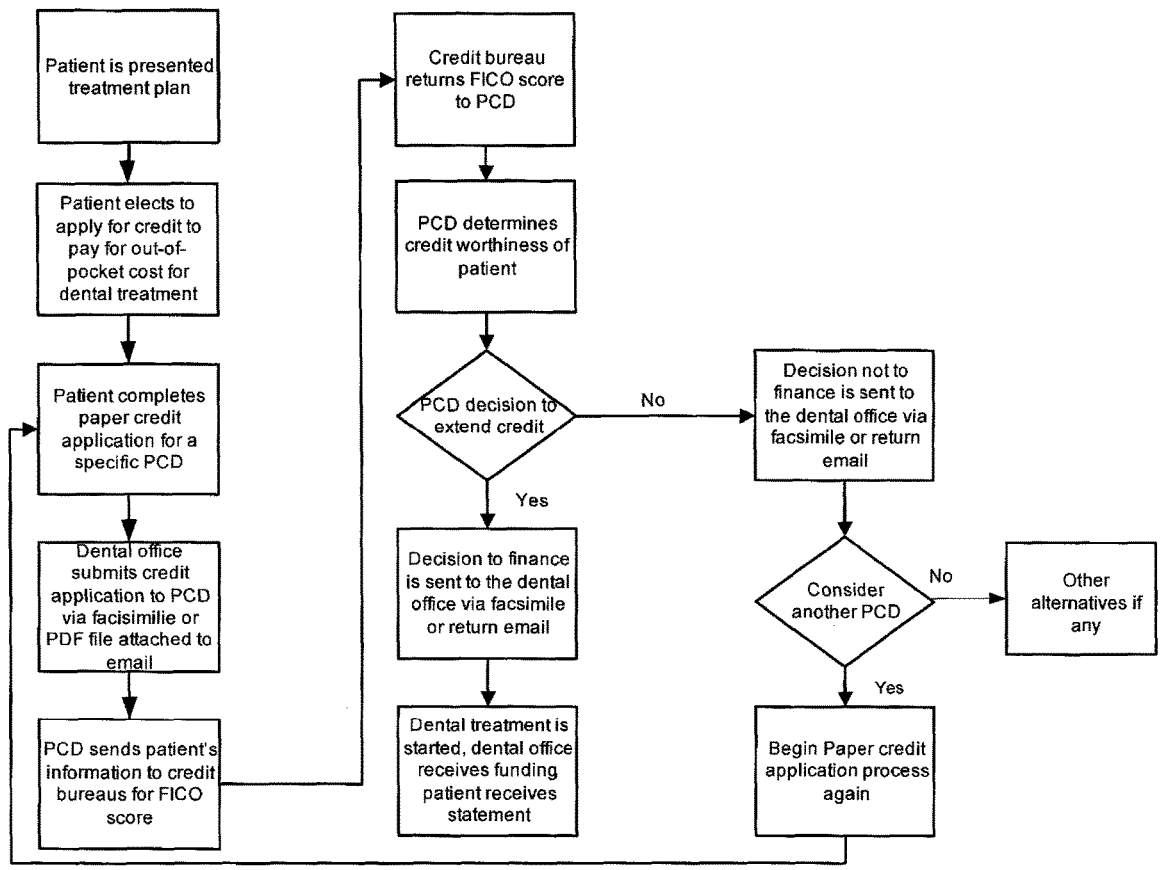
FIG. 3 is a flow diagram for conventional patient financing for healthcare procedures, as known in the art.

The DIRC electronically tracks the assigned dental claim during the adjudication process and can update the dentist as to whether the claim was paid in full, partial payment was made and the reason for the partial payment, or the claim was denied and the supporting documentation (see FIG. 3A). The dentist can log into their eDentaFi account via the eDentaFi web portal and can track the progress of their assigned claim or the status of their account. If the claim was partially paid or denied, the DIRC can send a message to the dental office noticing the dental practice that the claim will be re-submitted in an attempt to overcome the denial or partial payment (see FIG. 5A), or not re-submitted and reconciled against the current reconciliation carryover (see FIG. 6). During the re-submission process, DIRC reconciles the difference with the next claim submitted by the dental office (see FIG. 6).

FIG. 7 shows a more detailed transaction summary of an example assignment of John Smith's dental claim to the eDentaFi platform by Dr. Jane Smith after she delivered $250.00 in dental treatment to Mr. Smith on May 5, 2010, under an embodiment. More specifically, this example tracks accounting transactional information that is exchanged between the eDentaFi platform and the dentist's practice management system at the level of the patient account. Furthermore, this information from the eDentaFi platform can be automatically or manually posted to the patient's account. If automatically posted, the dentist logs into the eDentaFi platform and the patient account information is downloaded into the dentist's practice management system at the level of patient accounting. The claim was assigned to eDentaFi via the eDentaFi web portal and the claim electronically submitted to Mr. Smith's dental insurance plan on May 5, 2010 by Dr. Jones' practice management system. On May 6, 2010, the eDentaFi platform accepted the assigned dental claim with a value of $250.00. Alternatively, the assigned claim could be electronically submitted by the eDentaFi platform to the patient's dental insurance plan. The claim was discounted 20% less a DIRC processing fee of $5.00 and an electronic wire transfer of $195.00 was sent on May 6, 2010 to Dr. Jones along with documentation for the assignment, description of payment, and postable data file for the dentist's practice management system at the level of the patient account. In this series of transactions, Dr. Jones recognizes $250.00 in revenue from the delivery of dental services to Mr. Smith. Payment by Mr. Smith to Dr. Jones for dental services was deferred pending submission and payment of the $250.00 dental claim, and as such, Dr. Jones' accounts receivable for Mr. Smith shows a balance of $250.00 in anticipation of collecting some or all of the dental claim from Mr. Smith's dental insurance plan. Upon acceptance of the assigned claim by the eDentaFi platform, a payment of $195.00 was wire transferred to Dr. Jones along with supporting documentation. The eDentaFi payment transaction can be sent electronically to Dr. Jones and autopost to Dr. Jones'accounts receivable module in her practice management system or her office can download the file from her eDentaFi account on eDentaFi's secure web portal. In the eDentaFi platform, the eDentaFi's accounting shows an account payable to Dr. Jones of $250.00 for the acceptance of Mr. Smith's assigned dental claim and an account receivable balance from Mr. Smith's dental insurance dental plan of $250.00. After discounting the claim and deducting the eDentaFi DIRC processing fee, the $195.00 payment sent to Dr. Jones would reduce eDentaFi's accounts payable balance by $200.00 (20% discount of the claim value) and show DIRC processing fee revenue of $5.00 and cash outflow to Dr. Jones of $195.00.

After review of the Mr. Smith's dental claim by his dental insurance plan, the dental insurance company paid the $250.00 claim in full. Payment and supporting payment information was sent by U.S. mail and received by eDentaFi's bank lockbox. The lockbox facility opens the mail from the dental insurance plan and digitally scans the insurance payment and information. The check was deposited into the eDentaFi bank account and the payment and insurance information electronically sent to and processed by the eDentaFi platform. Specifically, the claim payment was matched to the assigned claim, balanced and posted to the accounts receivable module in the eDentaFi platform and reconciled. Specifically, the $250.00 payment received from the dental insurance plan was matched, balance, reconciled, and auto posted to Dr. Jones' account in the eDentaFi platform with the following results. Cash of $250.00 was debited to the eDentaFi account on Jul. 16, 2010 and Mr. Smith's dental insurance accounts receivable was credited $250.00. The dental claim was paid in 40 days and at an annual factoring rate of 36%, the eDentaFi factoring fee was $10.00, and as such, cash disbursed to Dr. Jones was $40.00.

On Jun. 16, 2010, Dr. Jones received a $40.00 cash disbursement from eDentaFi in the form of a wire transfer for the remaining amount due from factoring Mr. Smith's dental insurance claim less the factoring fee. The payment was sent electronically to Dr. Jones and can also be sent in the form of a check and U.S. mail. The insurance information as well as the eDentaFi file to autopost into Dr. Jones' accounts receivable module of her practice management system to reconcile Mr. Smiths account balance is either sent electronically or can be retrieved from her account on the secure eDentaFi web portal.

In summary, Dr. Jones' assigns Mr. Smith's $250.00 dental claim to be electronically factored. Dr. Jones received $195.00 of the dental claim within 24 hours of assigning the claim to eDentaFi and electronically submitting the dental claim to Mr. Smith's dental insurance plan. Frequently, the inefficiency of dental offices coupled with the complexities of dental insurance claim submission results in aging of dental insurance accounts receivables for periods of 60 days and longer. With the eDentaFi factoring and DIRC platform, dentists can receive approximately 80% of their claim within 24 hours of assigning the dental claim as well as an autopostable file showing the assignment and transaction accounting. eDentaFi factoring significantly reduces dentist's accounts receivable, which is a key financial metric to measure and manage cash in a dental practice.

Returning to the summary, upon receipt of the $250.00 payment from Mr. Smith's dental insurance plan, Dr. Jones' account is updated and the remaining payment electronically sent to Dr. Jones along with the eDentaFi autopost file to reconcile Mr. Smith's account in Dr. Jones' practice management system. One of the salient features of the eDentaFi platform centers on streamlining the insurance revenue cycle using the eDentaFi electronic dental insurance revenue cycle simultaneous to reducing dentist's accounts receivable balances and aging. In addition, dental offices can leverage the eDentaFi platform to improve their dental insurance business process and streamline dental office finance and accounting processes. For Mr. Smith's $250.00 dental claim, the dental office spent a minimal amount of time managing the transaction and received approximately 80% of the dental claim within 24 hours of delivery dental services. Under the current dental insurance revenue cycle commonly used by dentist, the dental claim may have taken 60 days or longer to receive payment by the dental insurance company for some or all of the dental claim in addition to the significant time, resources, and overhead incurred by the dental office to manage the dental insurance revenue cycle.

Figure 8:
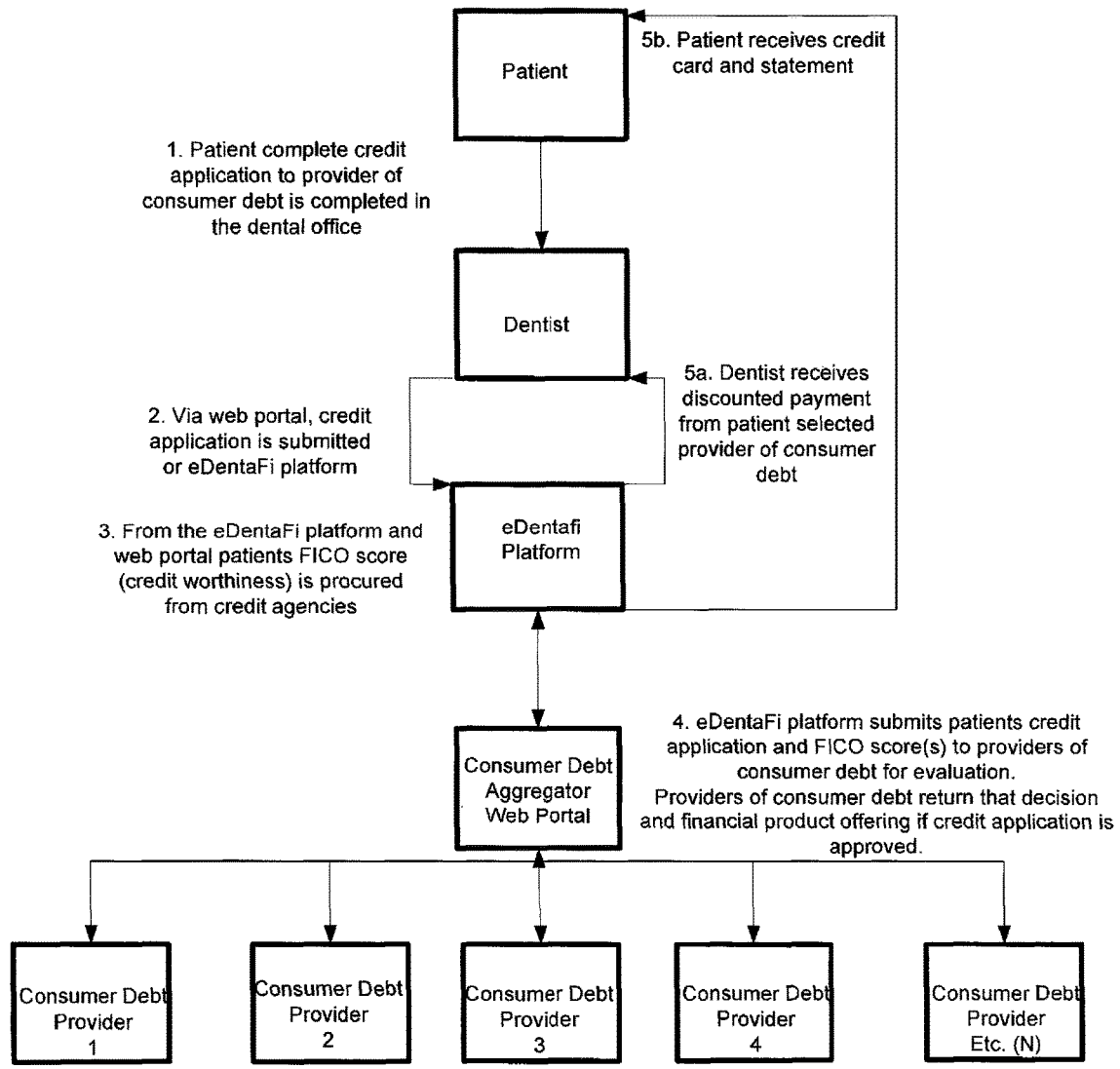
FIG. 8 is a block diagram of the eDentaFi Direct Consumer Debt Revenue Cycle (DCDRC) enabled by the eDentaFi platform, under an embodiment.
Figure 9:
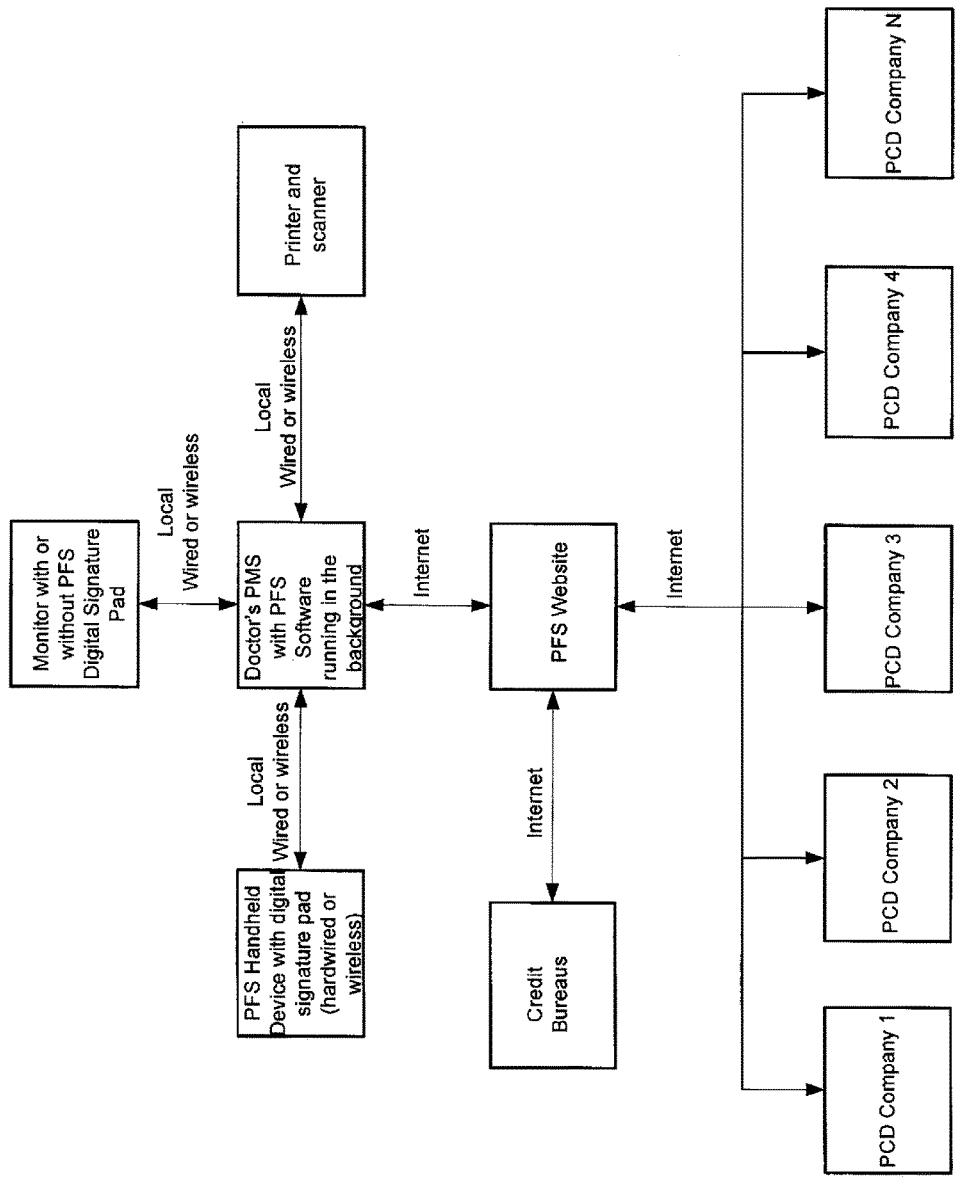
FIG. 9 is a block diagram of the Patient Financing System (PFS), under an embodiment.

FIGS. 8 and 9 are block diagrams of the eDentaFi Patient Financing System (or sometimes referred to as the Direct Consumer Debt Revenue Cycle or DCDRC)) enabled by the eDentaFi platform, under an embodiment. The eDentaFi platform is electronically coupled to one or more computers or systems at a treatment facility (e.g., doctor), and to third-party consumer debt providers via a consumer debt aggregator portal. In an alternative embodiment, a patient using a personal computer may be provided access to the eDentaFi platform to complete an application in advance of visiting the doctor. The coupling includes any type or combination of network technologies.

Embodiments of a Patient Financing System (PFS) are described herein. The PFS comprises one or more of platforms, systems, devices, applications or software, and an electronic site on the World Wide Web that collectively enables the electronic coupling or connection of patients to a spectrum of PCD financing companies. Consequently, the PFS provides processes that efficiently and electronically facilitate the communication between patients and PCD financing companies, thereby providing the best opportunities for patients seeking financing of healthcare procedures.

In the description herein, numerous specific details are introduced to provide a thorough understanding of, and enabling description for, embodiments of the PFS. One skilled in the relevant art, however, will recognize that these embodiments can be practiced without one or more of the specific details, or with other components, systems, etc. In other instances, well known structures or operations are not shown, or are not described in detail, to avoid obscuring aspects of the disclosed embodiments.

The systems and methods of the PFS include, in an embodiment, a network-based electronic infrastructure for coupling or connecting patients to a spectrum of PCD financing companies. The network of an embodiment includes public networks like the Internet, but can include private networks instead of or in addition to the public networks. The systems and methods described herein include and/or run under and/or in association with a processing system embodied in the PFS. The processing system includes any collection of processor-based devices or computing devices operating together, or components of processing systems or devices. As such, the PFS of an embodiment includes a PFS Platform and PFS Website which, for example, remotely and electronically couple or connect treatment facilities or healthcare providers (e.g., medical doctors, dentists, etc.) and their patients to multiple PCD financing companies. The PFS Platform therefore provides patients with an optimal opportunity for financing of healthcare procedures given the credit worthiness of the patient.

FIG. 9 is a block diagram of the Patient Financing System (PFS), under an embodiment. The PFS of an embodiment includes the PFS Platform and PFS Website. The PFS Platform runs remotely (e.g., web-based, application service provider (ASP), etc.) and is coupled or connected to a healthcare provider (e.g., treatment facility, hospital, doctor's office, etc.) and the facility patient management system (PMS), credit bureaus, and PCD companies. A healthcare provider, as the term is used herein, refers to one or more of treatment facilities, hospitals, doctors, and dentists, but is not so limited. The PFS also comprises PFS Software or Applications that run locally, for example, in the background of the healthcare provider practice management system (PMS), but the embodiment is not so limited. The PFS of an embodiment also includes a PFS Handheld Device (HHD) that can be coupled or connected via a wired and/or wireless coupling to the computer system at the healthcare provider. The PFS HHD comprises one or more of a keyboard, digital signature entry and capture device or component, LCD touch screen, PFS Software, and connectivity to the PFS Platform/Website via the network (e.g., Internet, etc.). The PFS also comprises a PFS Digital Signature Pad for accepting a patient's signature. Alternatively, the eDentaFi platform can invoke its digital signature platform that allows the patient to accept an electronic signature style and sign documentation such as the PFS electronic credit application form within the PFS.

The PFS Software and graphic user interface (GUI) allows the healthcare provider to specify their approach to helping patients procure financing of medical or dental procedures using PCD financing. There are numerous credit application options and/or strategies that the healthcare provider and/or patient can select via the PFS including, but not limited to, the following: sending the PFS CAF to all PCD companies; selecting specific PCD companies to direct the patient's PFS CAF; sending the patient's PFS CAF based on the patient's FICO score, wherein the patient's FICO score meets or exceeds the minimum funding FICO score for PCD financing companies; and, unbundling treatment plans into smaller treatment plans for financing by more than one PCD financing company.

The PFS streamlines the process of seeking financing by healthcare providers and their patients. In particular, the PFS comprises a PFS CAF that electronically imports patient name, address, and other information from the healthcare provider PMS and automatically populates the PFS CAF using the imported PMS data or information. FIG. 10 is an example electronic CAF of the PFS, under an embodiment. The patient can review a digital copy of the PFS CAF on a computer monitor or PFS HHD. Alternatively, the PFS CAF can be printed, reviewed, and in some cases signed, then the paper CAF can be converted to an electronic format (e.g., digitized) and converted via the PFS into the PFS CAF digital format. Corrections or additions to the PFS CAF can be made and the patient can use the PFS digital signature pad locally connected to the healthcare provider's computer system and usually alongside the monitor or the PFS HHS digital signature capture capabilities.

The signed PFS CAF is uploaded to the PFS Platform or directly to the PFS Website and is ready to be processed through the PFS Platform/Website to the aggregated PCD financing companies. According to the needs of the patient, the PFS GUI allows the healthcare provider's office to choose Selective or Non-Selective processing of the patient's PFS CAF to the aggregated PCD financing companies connected to the PFS Website, as described in detail below.

In general, Non-Selective processing of the PFS of an embodiment electronically pushes the patient PFS CAF (Jane Smith for example) downstream via the network or internet to the credit bureaus to capture the patient FICO score, then to all of the PCD financing companies for review of the patient's credit worthiness using the PFS CAF. In some cases, PCD financing companies require the CAF in the PCD specific format. The PFS platform comprises templates to convert the PFS CAF to a CAF specific to the PCD financing company.

The PCD financing companies return a decision of whether or not to extend credit after reviewing the patient CAF received via the PFS. These decisions by the PCD financing companies are shown or presented by the PFS Website when logged into the PFS Website, wherein the financing decisions are displayed on a computer monitor or PFS HHD. FIG. 11 is an example PFS presentation of the results of the PFS process, under an embodiment. In the cases where credit is extended, the terms of the underlying credit products are displayed for the patient and/or healthcare provider to select.

When a patient selects a credit provider, the patients signs a PFS credit acceptance form using the PFS digital signature pad, and the signed PFS credit acceptance form is electronically sent to the PCD financing company. Similar to the PFS CAF and mapping of the PFS CAF to specific PCD financing company's CAF, the PFS comprises templates to map the PFS credit acceptance form to PCD financing companies' credit acceptance form. The PCD financing companies that approved credit for the patient but were not selected by the patient as a provider are notified of the patient decision electronically via the PFS. Alternatively, the healthcare provider can first view the finance products as result of the PCD financing companies accepting the patient's credit application and select the appropriate finance product before the patients selects the final finance product.

Figure 12:
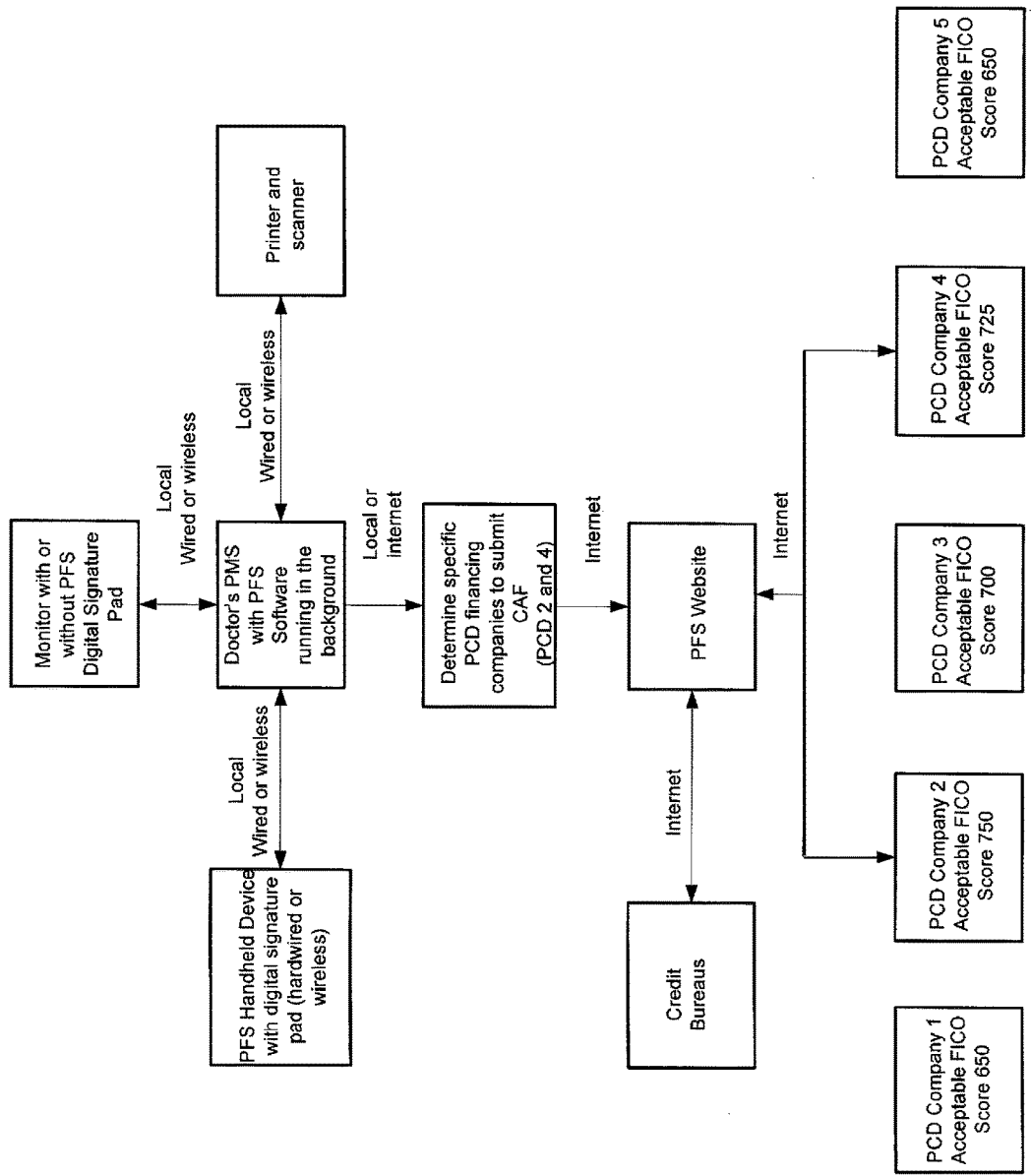
FIG. 12 is a flow diagram for Selective Processing of the PFS, under an embodiment.

In general, the Selective processing of the PFS of an embodiment allows the patient or healthcare provider in the treatment example herein to electronically direct the patient's PFS CAF to specific PCD financing companies. FIG. 12 is a flow diagram for Selective processing of the PFS, under an embodiment. For example, if the healthcare provider desires to submit the patient PFS CAF to two particular PCD financing companies, then the healthcare provider would select the appropriate PCD financing companies with which to begin processing.

In an embodiment of the PFS, the patient's FICO score is procured once from one or more credit bureaus, electronically attached or integrated into the patient's PFS CAF, and selectively or non-selectively transferred electronically to PCD financing companies aggregated on the PFS Website. Using the PFS, a patient's credit application along with a set of FICO scores and an amount to be financed is provided to one or more PCD companies based on a number of parameters including but limited to FICO score, amount to be financed, and combination of FICO scores and amount to be financed. The PFS therefore enables unbundling of healthcare treatment plans into incrementally smaller and less expensive treatment plans, such that credit applications can be transmitted to one or more PCD companies for financing of each unbundled healthcare treatment plan.

The PFS via the PFS Website can send one PFS CAF with FICO score(s) to one PCD financing company or simultaneously to multiple PCD financing companies. In another scenario, the PFS CAF with FICO score(s) can be selectively sent via the PFS Platform to PCD financing companies wherein the minimum FICO score threshold required to extend credit is known (FICO Score Filtering in FIG. 13). For example, and with reference to FIG. 11, if a PCD financing company is likely to finance a healthcare treatment plan amount up to $10,000 for FICO scores above 675 and a patient has a $4,000 dental procedure to finance with a FICO score of 690, then the PFS would send the PFS CAF to the PCD financing company with FICO funding thresholds of 690 or less (e.g., PCS Companies 1 and 5). If, on the other hand, the patient's FICO score is 640, then PFS will not send the credit application to any of the PCS companies presented and would return a message stating the patient's FICO does not meet the minimum funding level for the PCD financing companies selected.

The PFS devices, methods, and processes are exemplified and outlined using the dental example outlined above with reference to FIGS. 9, 10, 11, and 12. The PFS Software can reside on the healthcare provider computer system and run in the PMS background. The healthcare provider can also log into the PFS Website via the Internet and run the PFS Software remotely from the Website. When a patient desires to seek third party financing for the $4,000 out-of-pocket costs, then the healthcare provider office administrator clicks on the PFS icon and starts the PFS financing process. Alternatively, the healthcare provider office administrator can be working in the PMS and click the PFS icon and begin working simultaneously and, for example, export the patient name, address, and social security number (if available) from the PMS to the PFS CAF. The healthcare provider information (number) is automatically populated on the PFS CAF. FIG. 10, described above, includes a sample of the PFS CAF.

The PFS Software comprises CAF and credit acceptance form templates corresponding to the PCD financing companies. If the PCD financing company prefers to have the CAF submitted, for example, in a specific format, then the PFS Software maps from the PFS CAF to the PCD financing company CAF.

The patient's information can be exported from the PMS to the PFS CAF where it is used to populate the CAF. Any information missing on the PFS CAF can be entered via the computer system or by the PFS HHD. The patient reviews the PFS CAF, corrects, updates, or adds any additional information, and signs the PFS CAF using the digital signature pad. After signature, the PFS will prompt the healthcare provider office whether for a number of items prior to sending the PFS CAF to all of the PCD financing companies (Non-Selective Process) or to set filter parameters for Selective Processing.

The PFS CAF with the digital signature is sent via the Internet to the PFS Website with the electronic instructions provided by the healthcare provider office and patient (Non-Selective Processing in this example). The patient name, address, and social security number is sent to the credit bureaus by the PFS Website, and a FICO credit score is returned to the PFS Website and attached to the PFS CAF. Prior to sending the PFS CAF with FICO score to the PCD financing companies, the PFS Platform maps the treatment facility's PFS identification number to the specific PCD financing company's healthcare provider identification number. Each PFD CAF with the specific healthcare provider identification number is sent to the corresponding PCD financing company. Each PCD financing company reviews the patient PFS CAF and returns their decision to the PFS Website, which then securely displays the results at the dental office. As described above, FIG. 11 shows the result of processing a patient's (Jane Smith) $4,000 out-of-pocket costs for dental treatment.

The PFS operations or processes of an embodiment comprise coupling or connecting from the dental office computer system to the PFS Software and/or PFS Website. At the level of the healthcare provider office, the administrator enters the PFS Software and prompts the administrator to select the type of credit application submission (Selective or Non-Selective) via the PFS and populate the PFS CAF. From either the PFS Software or the PMS, the PFS CAF is populated with the patient's name, address, and other information. The PFS CAF is reviewed by the dental office and patient and any additional information is added and amended. Review of the PFS CAF is accomplished by printing the PFS CAF after the patient's data has populated the application and allowing the patient to complete or review the PFS CAF. Upon successful completion of the CAF, the patient uses the PFS Electronic Signature Pad and signs the PFS CAF.

Alternatively, review of the PFS CAF is accomplished using the PFS HHD. The patient completes and reviews the PFS CAF via the PFS HHD. The patient signs the PFS CAF using the PFS HHD once the PFS CAF is completed.

The completed PFS CAF is electronically sent from the healthcare provider via the Internet to the PFS Website. The PFS Website sends the patient name, address, and social security number to the credit bureaus and, in response, the FICO score is returned to the PFS Website and added to the PFS CAF. Before electronically sending the patient PFS CAF to PCD financing companies, the PFS Website Platform completes the PFS CAF by matching and mapping the healthcare provider PFS identification number to the healthcare provider identification number with the PCD financing companies that are to review the patient CAF. In some cases, PCD financing companies prefer to review the CAF using their designated CAF. As such, the PFS Platform/Software or PFS Website can map the patient PFS CAF to a PSC financing company-specific CAF.

The PFS Website transmits the PFS CAF (including patient FICO score, amount to be financed, and healthcare provider identification number) to PCD financing companies. PCD companies review the patient PFS CAF and return their decisions. The PFS Website sends the PCD financing company's decisions to the healthcare provider where they can be viewed via the GUI. The decision from PCD companies would include terms of any financing offered.

The patient, either using the PFS HHD or a computer at the healthcare provider, can select the finance product offered by any of the PCD financing companies approving the patient's credit application. Once selected, the selected provider of consumer debt financing is notified via the PFS. The selected provider of consumer debt financing acknowledges the acceptance and reconciles the financed showing the gross amount financed less fees and discounts (net amount financed). The healthcare provider receives the net amount financed, and the patient receives a statement showing the gross amount financed.

Figure 13:
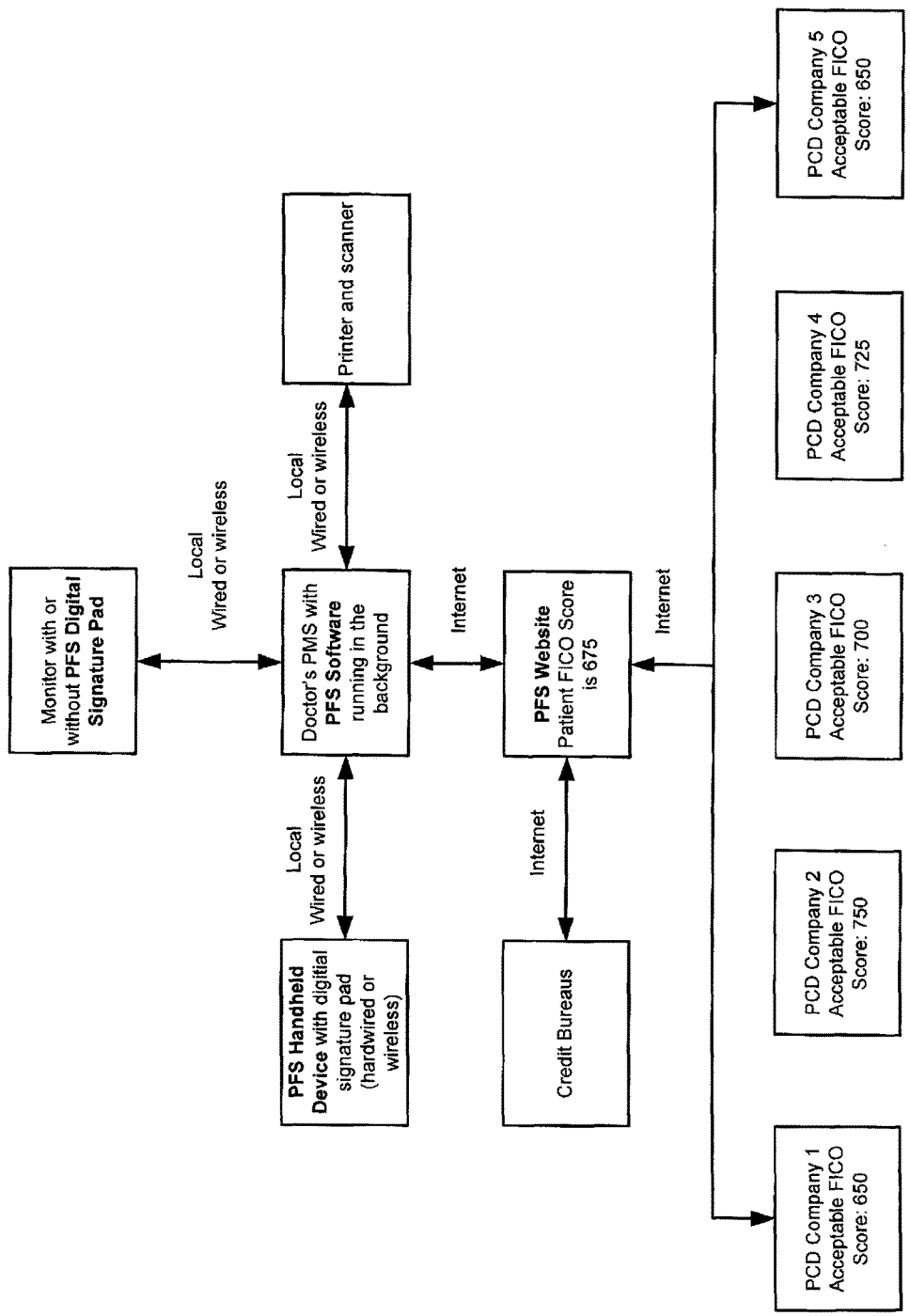
FIG. 13 is a flow diagram of FICO Score Filtering of the PFS, under an embodiment.

There are numerous variations to the PFS process described herein. For example, the PFS of an embodiment comprises FICO Score Filtering. FIG. 13 is a flow diagram of FICO Score Filtering of the PFS, under an embodiment. Following is an example of FICO Score Filtering under an embodiment. The minimum acceptable FICO score by PCD financing companies can be stored in the PFS Platform (see FIGS. 4, 11, and 12 described above for examples of the minimum FICO acceptance or threshold scores). Once the patient FICO score is received at the PFS Platform, the PFS CAF can be selectively sent only to PCD companies for which the patient's FICO score is in the acceptance range. For example, if the patient's FICO score is 675, then the PFS FICO filtering algorithm enables only PCD companies 1 and 5 as the candidate companies that match the patient FICO score with their minimum acceptable FICO score. The FICO Score Filtering can be automatic, or set at the level of the healthcare provider when the PFS CAF is processed and transmitted to PCD financing companies for credit evaluation. The PFS FICO Score Filtering centers on the processing cost at the level of the PCD companies such that patient's that would not quality based on a PCD financing company's threshold acceptance score are not processed by that particular PCD financing company.

Figure 14:
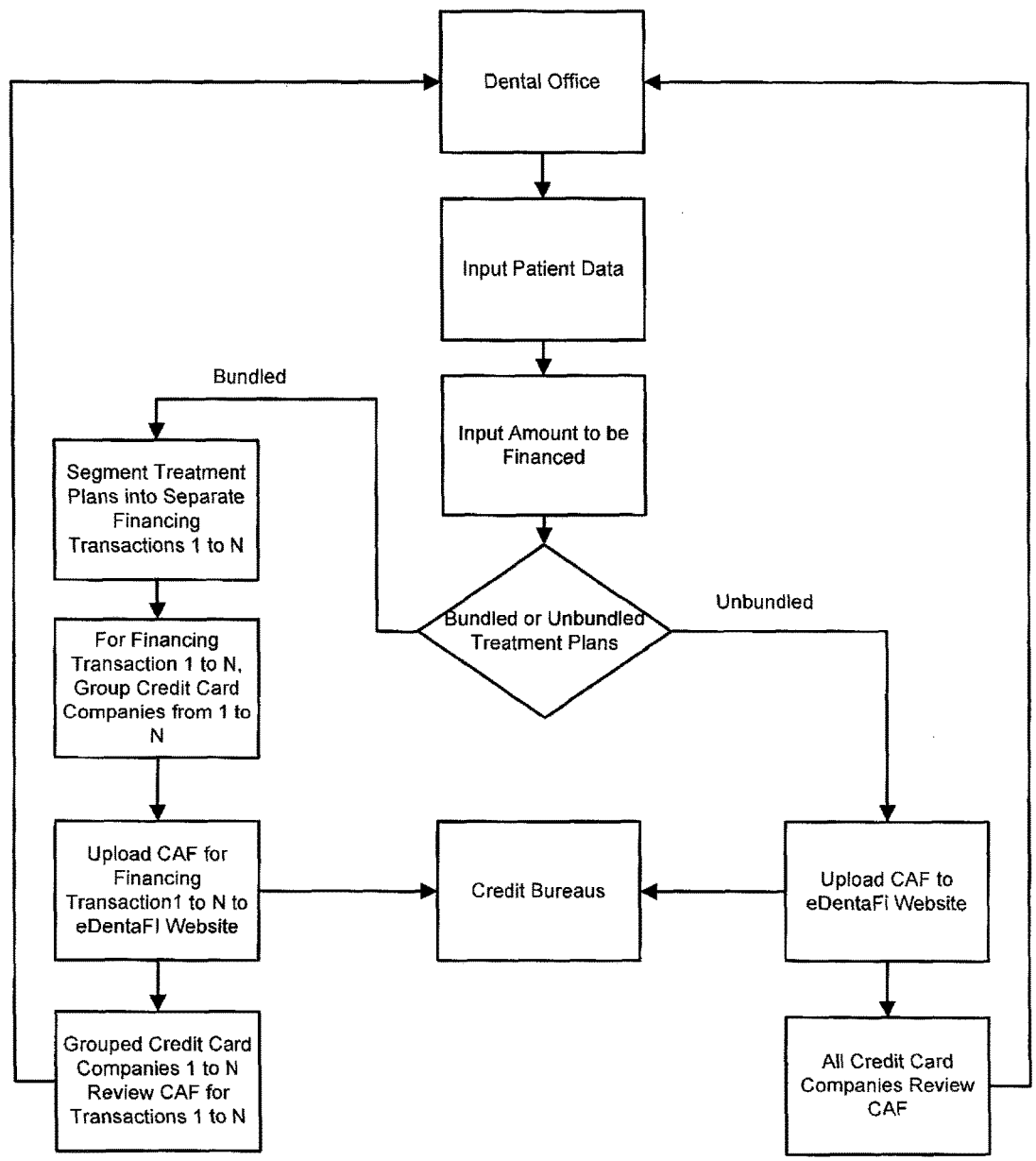
FIG. 14 is a flow diagram of unbundling and selective processing of healthcare treatment plans using the PFS, under an embodiment.

The PFS of an embodiment comprises Selective Standard Submission with Unbundling and FICO Score Filtering. FIG. 14 is a flow diagram of unbundling and selective processing of healthcare treatment plans, under an embodiment. Using the example presented above, there are treatment instances when out-of-pocket costs exceed $4,000. For example, partial or full mouth reconstruction using dental implants can cost the patient $25,000, or more with little or no dental insurance coverage. The PFS of an embodiment comprises several different processes for unbundling and processing the patient PFS CAF. For example, the $25,000 procedures can be divided into two dental treatment plans, one for $10,000 and the other for $15,000. The two unbundled treatment plans can be sequentially submitted after presenting the $25,000 dental treatment plan to the patient. After completing the PFS CAF for the $10,000 of the unbundled $25,000 treatment plan, the patient's PFS CAF is processed. The Selective process can be used under which specific PCD financing companies selected, but the embodiment is not so limited.

Alternatively, the FICO can be procured and the FICO Score Filter process can be selected and modified by selecting the specific PCD financing companies to which the $10,000 credit application is submitted (Modified FICO Score Filtering). In this example, the Modified the FICO Score Filtering process is invoked. Accordingly, the patient FICO is procured, matched with PCD financing companies wherein the FICO score meets or exceeds the PCD companies' threshold FICO score, and this result returned to the healthcare provider for evaluation and selection. The healthcare provider selects a set of PCD financing companies to submit the patient's $10,000 credit application. The patient's CAF is processed via the PFS and the results returned to the healthcare provider for evaluation by the healthcare provider and/or patient.

Once the credit application process for the unbundled $10,000 dental treatment plan is completed, the unbundled $15,000 dental treatment can be submitted. When submitting the $15,000 dental plan for financing, the patient and/or dental office would select a different set of PCD financing companies to review the credit application when compared to the unbundled $10,000 credit application. In summary, if a PCD financing company finances the $10,000 dental treatment plan, then the second unbundled $15,000 treatment plan of the $25,000 dental treatment plan is processed using the FICO Score Filter and a set of prospective PCD financing companies that are manually selected to be different from the PCD financing companies evaluating the unbundled $10,000 dental treatment plan. The $15,000 dental treatment plan is evaluated by the proposed PCD financing companies and the decision returned.

In some cases, PCD financing companies may openly and/or competitively bid on the financing of healthcare procedures for certain patients. The patient PFS CAF with the FICO score is posted securely on the PFS Website to be viewed by PCD financing companies. The PFS Website via connectivity to PCSD financing companies can facilitate a bidding process for terms to provide financing. The most attractive financing terms can be selected by the patient.

In some cases, PCD financing companies may elect not to participate (opt out) in the PFS process to finance healthcare procedures. The PFS Website can connect to the PCD financing company opting out and send the PFS CAF with or without the patient FICO score.

An element of the eDentaFi PFS (or DCDRC) includes, but is not limited to, completing the DCDRC patient application in the dental office. The CAF of the PFS (FIG. 10) can be entered digitally by the patient at a computer terminal or completed using a paper application. At times, the dental office has the patient information in digital format (for example, in the case of a practice management system integration) and can be imported. Using this method, the patient reviews the CAF and signs the electronic application using the digital signature pad or digital signature feature in the PFS. If the CAF is paper, dental office personnel manually enter the information into the computer. The patient reviews the CAF for correctness and uses a digital signature pad to sign the DCDRC application.

Completed CAF's are electronically sent to the eDentaFi platform via the eDentaFi web portal accessible by the dental office. The CAF is submitted to the eDentaFi portal aggregating providers of consumer debt. The eDentaFi platform submits certain aspects of the CAF the credit agencies to procure the patient's FICO score. After the patient's credit worthiness is scored, the CAF is submitted through the eDentaFi platform to the eDentaFi portal aggregating providers of consumer debt.

Providers of consumer debt review the patient's CAF and respond to the dental office via the eDentaFi platform. The patient selects a financing option from a menu of financing products approved by the provider(s) of consumer debt (FIG. 11). The selected finance product is returned to the selected provider of debt via the eDentaFi platform.

Funding of the dental treatment plan or procedure is provided and electronically transferred to the dentist account directly or in the eDentaFi platform. The corresponding credit card and statement is sent directly to the patient from the provider of consumer debt financing. eDentaFi charges a fee for processing the CAF through the eDentaFi PFS platform and web portal.

Dental offices can integrate the eDentaFi PFS platform into the dental practice via a subscription or per use fee. The PFS can run or be accessed in the background of dental practice management systems or other products, via a web portal, and/or as a stand-alone offering.

Figure 15:
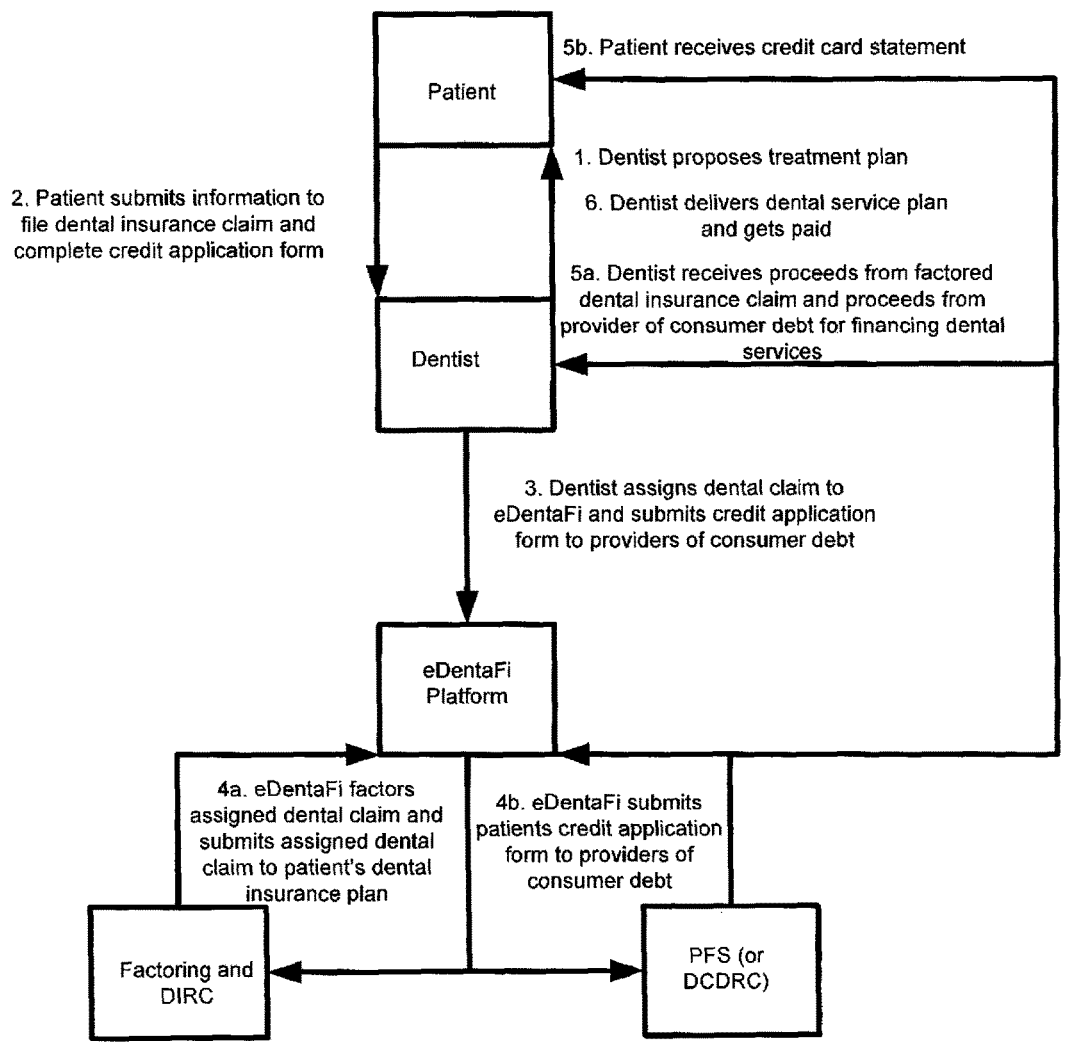
FIG. 15 is a block diagram of a dental service example using the eDentaFi dental revenue cycle combining DIRC and DCDRC enabled by the eDentaFi platform, under an embodiment.

FIG. 15 is a block diagram of the dentist using the eDentaFi platform to facilitate the delivery of dental services by factoring the assign dental claim and seeking patient financing for the proposed dental treatment plan through the PFS enabled by the eDentaFi platform, under an embodiment. The combined DIRC and PFS simultaneously process dental insurance and patient financing. The eDentaFi platform is electronically coupled to one or more computers or systems at a treatment facility (e.g., doctor) and a DIRC platform and a DCDRC platform. In an alternative embodiment, a patient using a personal computer may be provided access to the eDentaFi platform. The coupling includes any type or combination of network technologies.

The eDentaFi platform of an embodiment assists dentists and their dental practices with practice cash flows and in particular the cash sources of their working capital management. From the perspective of the revenue contribution of the dental income statement and working capital management, sources of cash to the dental practice are derived from cash or check paid by the patient, patient credit card, dental insurance, patient financing via providers of unsecured consumer debt financing, and/or credit extended by the dentist via patient billing, to name a few. The eDentaFi platform converts accounts receivable to cash and compresses accounts receivable to the level of credit extended by the dentist to patients from patient billing by the dental office.

FIG. 16 shows an example of a patient seeking the services of a dentist that is recommending a $5,000 dental treatment plan, $1,000 of which is covered by the patient's dental insurance plan and the remaining $4,000 would be required to be covered by the patient as an out-of-pocket cost, under an embodiment. The patient elects to move forward with the proposed dental treatment plan if they could secure financing through the PFS of the eDentaFi platform. The patient completes the CAF which is submitted to providers of consumer debt via the PFS of the eDentaFi platform. The patient's CAF is approved by a PCD and the remaining $4,000 of the proposed treatment plan is financed. This entire process to assign the dental claim, submit the dental claim to the dental insurance plan, complete and submit the patient's CAF through the PFS is very efficient and takes on the order of several minutes in the dental office. The benefits of the eDentaFi platform streamlines the delivery of dental services, provides a service to the patient by facilitating their dental treatment, allows the dentist to deliver the treatment plan to treat the patient's dental condition, streamlines back office financial processes, and increases the dentist's service revenues. More specifically, the dentist, using the eDentaFi platform, delivers $5,000 in dental services to the patient that he/she would not have otherwise delivered. In addition, the dentist would receive $4,390.00 of the $5,000 dental service within about 2 business days with the remaining $187.20 in about 20 after factoring the assigned dental claim.

In the description above, numerous specific details are introduced to provide a thorough understanding of, and enabling description for, embodiments of the DIRC, DCDRC, and eDentaFi platform. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the DIRC, PFS, DCDRC, and eDentaFi platform is not intended to be exhaustive or to limit the systems and methods described to the precise form disclosed. While specific embodiments of, and examples for, the DIRC, PFS, DCDRC, and eDentaFi platform are described herein for illustrative purposes, various equivalent modifications are possible within the scope of other systems and methods, as those skilled in the relevant art will recognize. The teachings of the DIRC, PFS, DCDRC, and eDentaFi platform provided herein can be applied to other processing systems and methods, not only for the systems and methods described above.

The elements and acts of the various embodiments described above can be combined to provide further embodiments. These and other changes can be made to the DIRC, PFS, DCDRC, and eDentaFi platform in light of the above detailed description.

The elements and acts of the various embodiments described above can be combined to provide further embodiments. These and other changes can be made to the embodiments described above in light of the above detailed description.

In general, in the following claims, the terms used should not be construed to limit the embodiments described above to the specific embodiments disclosed in the specification and the claims, but should be construed to include all systems that operate under the claims. Accordingly, the embodiments described above are not limited by the disclosure, but instead the scope is to be determined entirely by the claims.

While certain aspects of the embodiments described above are presented below in certain claim forms, the inventors contemplate the various aspects of the embodiments described above in any number of claim forms. Accordingly, the inventors reserve the right to add additional claims after filing the application to pursue such additional claim forms for other aspects of the embodiments described above.

What is claimed is:

1. A method comprising:
at least one application running on a processor of a platform, wherein the platform is configured as a communication intermediary between electronic transactions of each of a plurality of independent systems including a service provider, at least one payer, and a financial system, the at least one application,
accepting electronic assignment of a claim from a claimant, wherein the claim is assigned to the platform instead of being submitted to the at least one payer, wherein the claim is for a transaction between the service provider and the claimant;
wherein a scoring component of the at least one application generates a score that is a unique measure of claim reimbursement for the service provider, wherein the score is generated using data of a plurality of practice factors of the service provider including at least two of a type of the service provider, a location of the service provider, patient population data of the service provider, insurance reimbursement data of the service provider, current insurance receivable data of the service provider, historical insurance receivable data of the service provider, and submitted claims data of the service provider;
discounting the assigned claim, wherein an amount of the discount applied to the claim is based on the score, generating a payment to the service provider in an amount of the discounted claim, and submitting the claim to the at least one payer that is independent of the entity;
generating transaction data comprising data of the assignment and the payment, and providing the transaction data to the service provider;
tracking adjudication of the claim by the payer and providing status data of the adjudication; and
reconciling the payment to the service provider and updating the transaction data using final data of the adjudication, wherein, when the adjudication includes a third party payment received at the financial system from the at least one payer, a factoring component of the at least one application generates a factoring fee using a factoring rate and elapsed time between the submitting of the claim and receipt of the third party payment, wherein the reconciling includes applying the factoring fee to the payment to determine an amount owed to the service provider, wherein when the claim is at least one of denied and partially paid the reconciling comprises reconciling a difference between the payment to the service provider and a payment amount of the payer with at least one subsequent claim of the service provider.

2. A system comprising:
a platform comprising a processor coupled to a provider interface and a payer interface, wherein the platform is configured as a communication intermediary between electronic transactions of each of a plurality of independent systems including the provider, the payer, and a financial system, wherein the platform is hosted by an entity;
an electronic form presented via the provider interface that accepts inputting of a claim on behalf of a claimant, wherein the claim is for a transaction between the provider and the claimant;
wherein the platform accepts electronic assignment of the claim from the claimant, wherein the claim is assigned to the platform instead of being submitted to the at least one payer;
wherein a scoring component running on the platform generates a score that is a unique measure of claim reimbursement for the provider, wherein the score is generated using data of a plurality of practice factors of the provider including at least two of a type of the service provider, a location of the service provider, patient population data of the service provider, insurance reimbursement data of the service provider, current insurance receivable data of the service provider, historical insurance receivable data of the service provider, and submitted claims data of the service provider;
wherein the platform discounts the assigned claim, wherein an amount of the discount applied to the claim is based on the score, generates a payment to the provider in an amount of the discounted claim, and submits the claim to the payer, wherein the payer is independent of the entity;

wherein the platform generates transaction data comprising data of the assignment and the payment, and provides the transaction data to the provider;

wherein the platform tracks adjudication of the claim by the payer and provides status data of the adjudication; and wherein a reconciliation component running on the platform reconciles the payment to the provider and updates the transaction data using final data of the adjudication, wherein, when the adjudication includes a third party payment received at the financial system from the payer, a factoring component running on the platform generates a factoring fee using a factoring rate and elapsed time between the submitting of the claim and receipt of the third party payment, wherein the reconciling includes applying the factoring fee to the payment to determine an amount owed to the provider, wherein when the claim is at least one of denied and partially paid the reconciling comprises reconciling a difference between the payment to the provider and a payment amount of the payer with at least one subsequent claim of the provider.

3. The method of claim 1, wherein the service provider includes a practice.

4. The method of claim 3, wherein the practice is a dental practice.

5. The method of claim 3, wherein the practice is a medical practice.

6. The method of claim 1, wherein the transaction includes delivery of services.

7. The method of claim 6, wherein the delivered services include one or more of dental and medical services.

8. The method of claim 1, wherein the assigning comprises automatic assignment of the claim.

9. The method of claim 1, wherein the assigning comprises selective assignment of the claim.

10. The method of claim 1, wherein the claim includes identifying information of the claimant.

11. The method of claim 1, wherein the claim includes identifying information of the service provider.

12. The method of claim 1, wherein the claim includes information of the insurance policy.

13. The method of claim 1, wherein the claim includes treatment data relating to the delivered services.

14. The method of claim 13, wherein the treatment data includes one or more of a digital radiograph and a film radiograph.

15. The method of claim 1, wherein the discounting the claim comprises determining a discount according to factors that include at least one of a score of the service provider, an amount of the claim, and an insurance policy corresponding to the claimant, wherein the score comprises a reimbursement metric of the practice.

16. The method of claim 1, wherein the plurality of practice factors include one or more attributes of the practice.

17. The method of claim 16, wherein the one or more attributes comprise type of the practice.

18. The method of claim 17, wherein the type of the practice comprises a solo practice.

19. The method of claim 17, wherein the type of the practice comprises a group practice.

20. The method of claim 17, wherein the type of the practice comprises a specialty practice.

21. The method of claim 16, wherein the one or more attributes include a location of the practice.

22. The method of claim 21, wherein the location is rural.

23. The method of claim 21, wherein the location is urban.

24. The method of claim 16, wherein the one or more attributes comprise information of a patient population of the practice.

25. The method of claim 24, wherein the information includes insurance coverage of at least one member of the patient population.

26. The method of claim 25, wherein the insurance coverage includes private insurance.

27. The method of claim 25, wherein the insurance coverage includes public insurance.

28. The method of claim 16, wherein the one or more attributes include insurance reimbursement processes of the practice.

29. The method of claim 28, wherein the insurance reimbursement processes include one or more of paper and electronic processes.

30. The method of claim 16, wherein the one or more attributes include information of at least one of current and historical aged insurance receivables.

31. The method of claim 16, wherein the one or more attributes include number of claims submitted by the practice for reimbursement.

32. The method of claim 31, wherein the one or more attributes include reimbursement levels relating to the submitted claims.

33. The method of claim 1, the generating the payment comprising applying a processing fee.

34. The method of claim 33, comprising transmitting the payment to the service provider within a pre-specified period.

35. The method of claim 1, wherein the submitting the claim to a payer comprises individually submitting the claim to a plurality of payers, the plurality of payers including the payer.

36. The method of claim 35, wherein the submitting comprises submitting the claim to a payment clearing house.

37. The method of claim 36, wherein the reconciling comprises resubmitting the claim when the claim is partially paid or denied.

38. The method of claim 36, wherein the reconciling comprises receiving payment of the adjudicated claim from the payer.

39. The method of claim 38, wherein the reconciling comprises receiving supporting information relating to at least one of the received payment and the adjudicated claim, the received supporting information including the adjudication data.

40. The method of claim 39, wherein the reconciling comprises receiving one or more of the received payment and the received supporting information electronically.

41. The method of claim 39, comprising receiving the received payment and the received supporting information using a lockbox facility, wherein the financial system includes the lockbox facility.

42. The method of claim 41, wherein the lockbox facility processes paper correspondence relating to at least one of the received payment and the received supporting information.

43. The method of claim 42, wherein the processing includes converting the paper correspondence into an electronic format.

44. The method of claim 39, wherein the reconciling comprises matching the received payment against the claim.

45. The method of claim 44, wherein the reconciling comprises reconciling the received payment with the claim.

46. The method of claim 45, wherein the reconciling the received payment with the claim comprises applying a processing fee.

47. The method of claim 46, wherein the reconciling comprises computing a reconciliation carryover balance.

48. The method of claim 47, wherein the reconciling comprises applying the reconciliation carryover balance to one or more claims of the service provider.

49. The method of claim 1, comprising providing information of the at least one of the tracking and reconciling to an account of the service provider.

50. The method of claim 49, wherein the providing includes automatically posting the information of the at least one of the tracking and reconciling to the account of the service provider.

51. The method of claim 49, wherein the providing includes downloading the information of the at least one of the tracking and reconciling to the account of the service provider.

52. The method of claim 49, wherein the account is accessible through a web interface.

53. The method of claim 49, wherein the information of the at least one of the tracking and reconciling includes status of the claim.

54. The method of claim 53, wherein the status is paid in full.

55. The method of claim 53, wherein the status is partially paid.

56. The method of claim 53, wherein the status is denial of payment.

57. The method of claim 53, wherein the information of the at least one of the tracking and reconciling includes documentation relating to the status.

58. The method of claim 1, wherein the assignment of the claim is performed on a per-claim basis.

59. The method of claim 1, wherein the assignment of the claim is performed on a subscription basis.

* * * * *